US012718333B2

(12) United States Patent
Meyer et al.

(10) Patent No.: US 12,718,333 B2
(45) Date of Patent: Aug. 25, 2026

(54) METHOD AND SYSTEM FOR LOW-FIELD MRI DENOISING WITH A DEEP COMPLEX-VALUED CONVOLUTIONAL NEURAL NETWORK

(71) Applicant: University of Virginia Patent Foundation, Charlottesville, VA (US)

(72) Inventors: Craig H. Meyer, Charlottesville, VA (US); Quan Dou, Charlottesville, VA (US); Zhixing Wang, Charlottesville, VA (US); Xue Feng, Zion Crossroads, VA (US); John P. Mugler, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 303 days.

(21) Appl. No.: 18/181,520

(22) Filed: Mar. 9, 2023

(65) Prior Publication Data

US 2023/0342886 A1 Oct. 26, 2023

Related U.S. Application Data

(60) Provisional application No. 63/318,169, filed on Mar. 9, 2022.

(51) Int. Cl.

| | |
|---|---|
| ***G06T 5/70*** | (2024.01) |
| ***G06T 5/50*** | (2006.01) |
| ***G06T 12/30*** | (2026.01) |

(52) U.S. Cl.

CPC .................. *G06T 5/70* (2024.01); *G06T 5/50* (2013.01); *G06T 12/30* (2026.01);

(Continued)

(58) Field of Classification Search

CPC . G06T 5/70; G06T 5/50; G06T 11/008; G06T 2207/10088; G06T 2207/20081;

(Continued)

(56) References Cited

U.S. PATENT DOCUMENTS

| | | | | |
|---|---|---|---|---|
| 9,569,843 | B1 * | 2/2017 | Mailhe | G06T 5/20 |
| 10,915,990 | B2 * | 2/2021 | Lebel | G06V 10/82 |

(Continued)

OTHER PUBLICATIONS

Manjón, J. V., & Coupé, P. (2018). MRI denoising using deep learning. In Patch-Based Techniques in Medical Imaging: 4th International Workshop, Patch-MI 2018, Held in Conjunction with MICCAI 2018, Granada, Spain, Sep. 20, 2018, Proceedings 4 (pp. 12-19).

(Continued)

*Primary Examiner* — Jose L Couso

(74) *Attorney, Agent, or Firm* — Meunier Carlin & Curfman LLC

(57) ABSTRACT

MR image data can be improved by using a complex de-noising convolutional neural network such as a non-blind C-DnCNN, a network for MRI denoising that leverages complex-valued data with phase information and noise level information to improve denoising performance in various settings. The proposed method achieved superior performance on both simulated and in vivo testing data compared to other algorithms. The utilization of complex-valued operations allows the network to better exploit the complex-valued MRI data and preserve the phase information. The MR image data is subject to complex de-noising operations directly and simultaneously on both real and imaginary parts of the image data. Complex and real values are also utilized for block normalization and rectified linear units applied to the noisy image data. A residual image is predicted by the C-DnCNN and a clean MR image is available for extraction.

16 Claims, 22 Drawing Sheets

(52) U.S. Cl.
CPC ............... *G06T 2207/10088* (2013.01); *G06T 2207/20081* (2013.01); *G06T 2207/20084* (2013.01); *G06T 2207/20224* (2013.01); *G06T 2211/424* (2013.01)

(58) Field of Classification Search
CPC . G06T 2207/20084; G06T 2207/20224; G06T 2211/424; G06T 5/60; G06T 2200/04; G06T 2207/10104; G06T 2207/20182; G06T 2207/10092; G06T 2207/30004; G06T 2207/30016; G06T 7/20056; G06T 5/73; G06T 7/0012; G06T 3/4046; G06T 9/002; G06T 2207/20076; A61B 5/055; A61B 5/7203; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/774; G06V 10/82; G06V 20/41; G06V 30/18057; G06V 20/698; G06V 30/19173; G06V 10/30; G06V 2201/03; G06F 18/214; G06F 18/22; G06F 18/241; G06F 18/24; G06F 18/2411; G06F 18/2415; G06F 30/27; Y10S 128/925; G01R 33/5608; G01R 33/5602; G01R 33/4818; G01R 33/4824; G01R 33/56341; G01R 33/565
See application file for complete search history.

(56) References Cited

U.S. PATENT DOCUMENTS

| | | | | |
|---|---|---|---|---|
| 11,348,226 | B2 * | 5/2022 | Ida | G01R 33/4818 |
| 2020/0033431 | A1 * | 1/2020 | Schlemper | G06T 5/70 |
| 2021/0076972 | A1 * | 3/2021 | Novikov | G01R 33/5608 |
| 2022/0188602 | A1 | 6/2022 | Meyer et al. | |
| 2022/0208355 | A1 * | 6/2022 | Li | G06T 7/174 |
| 2022/0373630 | A1 | 11/2022 | Dou et al. | |
| 2024/0233093 | A1 * | 7/2024 | Novikov | G06T 5/50 |

OTHER PUBLICATIONS

Silva, Thalles, An intuitive introduction to Generative Adversarial Networks (GANs); https://www.freecodecamp.org/ news/an-intuitive-introduction-to-generative-adversarial-networks-gans-7a2264a81394/, Jan. 7, 2018, 17 pages.
Feng, Xue, et al. “Brain tumor segmentation using an ensemble of 3d u-nets and overall survival prediction using radiomic features.” Frontiers in computational neuroscience 14 (2020): 25.
Feng, Xue, et al. “Kalman filter techniques for accelerated Cartesian dynamic cardiac imaging.” Magnetic Resonance in Medicine 69.5 (2013): 1346-1356.

* cited by examiner

FIG. 7
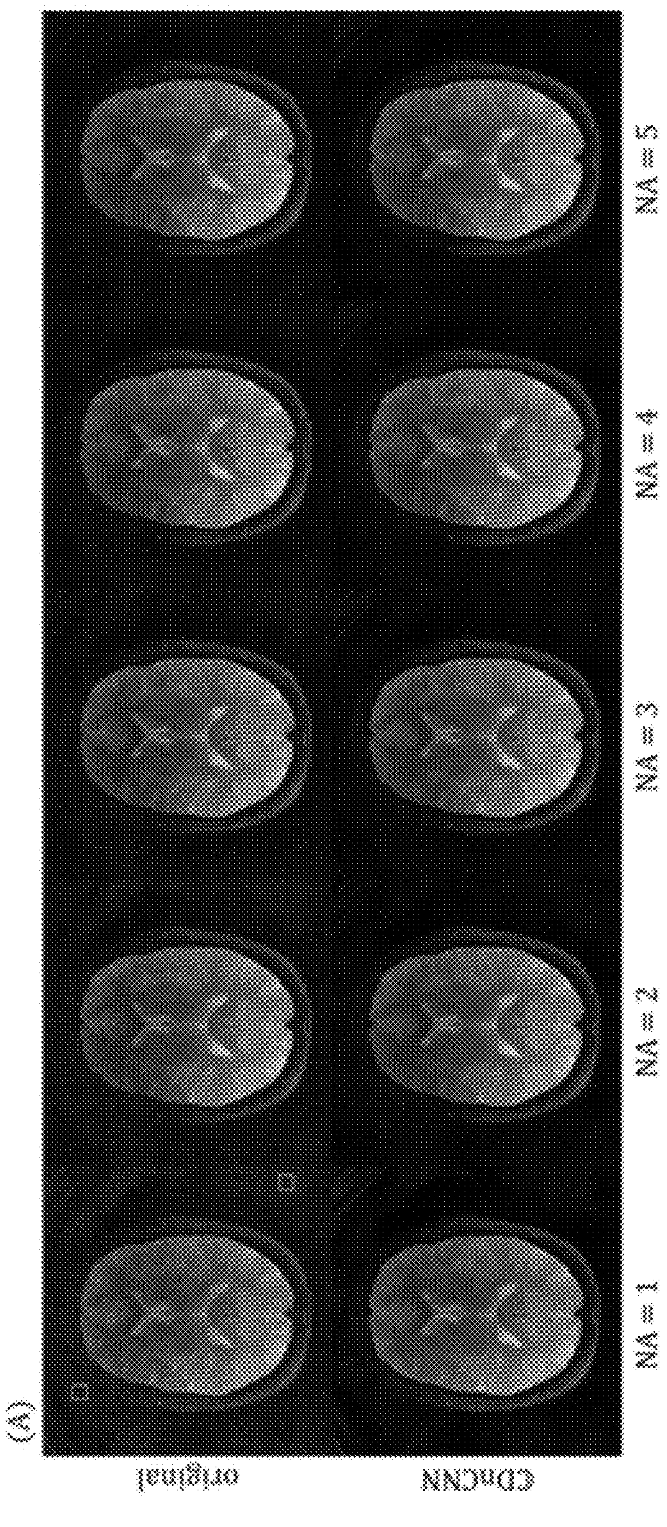

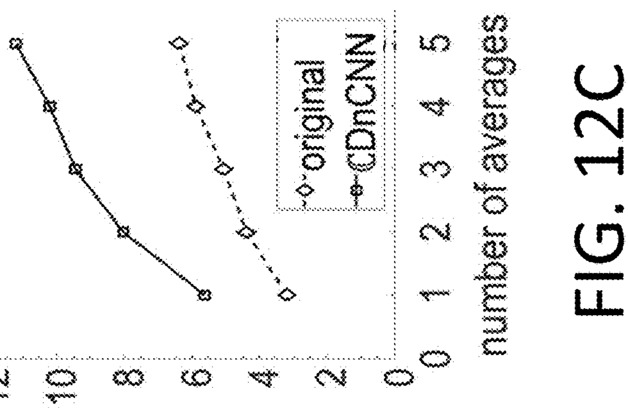
FIG. 12C
FIG. 12B
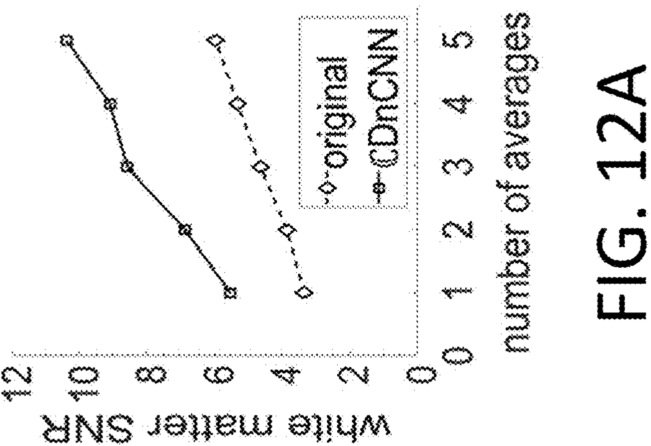
FIG. 12A

| | inference time / slice (GPU) | inference time / slice (CPU) | memory usage |
|---|---|---|---|
| NLM | - | 456 ms | 85 MB |
| BM3D | - | 2562 ms | 188 MB |
| DnCNN | 27 ms | 303 ms | 288 MB |
| ℂDnCNN | 79 ms | 1297 ms | 302 MB |
| non-blind ℂDnCNN | 154 ms | 1472 ms | 305 MB |

FIG. 21

METHOD AND SYSTEM FOR LOW-FIELD MRI DENOISING WITH A DEEP COMPLEX-VALUED CONVOLUTIONAL NEURAL NETWORK

CROSS-REFERENCE TO RELATED APPLICATION

This application claims priority to and benefit of U.S. Provisional Patent Application Ser. No. 63/318,169 entitled "Method and System for Low Field MRI De-Noising with a Deep Complex Valued Convolutional Neural Network" filed Mar. 9, 2022, which is hereby incorporated by reference herein in its entirety as if fully set forth below.

STATEMENT OF GOVERNMENT INTEREST

This invention was made with government support under Grant No. EB028773, awarded by the National Institutes for Health. The government has certain rights in the invention.

FIELD

The present disclosure relates to systems and methods for denoising magnetic resonance images using complex de-noising convolutional neural networks.

BACKGROUND

Magnetic resonance imaging (MRI) is an important diagnostic tool for various conditions, including brain conditions. Because of the good soft tissue contrast, non-invasiveness and lack of ionizing radiation of MRI, it is widely used as a diagnostic tool for brain conditions including stroke, tumors, multiple sclerosis (MS), hemorrhage, blood vessel issues, and neurodegenerative diseases. A clinical protocol often includes pre- and post-contrast T1, T2, fluid-attenuated inversion recovery (FLAIR), proton density (PD) and diffusion weighted images (DWI). Other advanced sequences such as magnetic resonance angiography (MRA) and perfusion MRI using dynamic susceptibility contrast (DSC) and arterial spin labelling (ASL) are also used for specific conditions. Although different contrasts provide enriched diagnostic information, the challenges are prolonged scan time and increased artifacts due to motion [1A], especially for pediatric patients who have trouble holding still during the scan and thus sedation/anesthesia is often needed for a successful exam [2A].

Extensive studies have been performed to accelerate MRI and reduce motion artifacts with the application to the brain and other regions of the body. Most studies have focused on improving the data acquisition strategies, such as using partial Fourier [3A], parallel imaging [4A-6A] and compressed sensing [7A] to reduce the number of acquired k-space lines without introducing aliasing, many of which are already widely used in clinical protocols. Retrospective [8A] and prospective [9A] motion correction methods have also been developed to specifically reduce the artifacts. However, these acquisition strategies often introduce trade-offs among speed, resolution and image quality, which is typically evaluated by the real or apparent signal-to-noise ratio (SNR), so that further acceleration of the scan can lead to reduced SNR and/or spatial resolution. In clinical practice, these aspects are balanced to yield a standard protocol. Denoising algorithms, which are applied during post-processing, can increase SNR without introducing any negative effects to the acquisition process and thus have the potential to shift the balance towards more aggressive acceleration and compensate for the reduced SNR in the original images.

Denoising algorithms can improve signal-to-noise ratio (SNR) without prolonging the scan time. Filter-based denoising methods, such as non-local means (NLM) and block-matching and 3D filtering (BM3D), suffer when dealing with small lesion regions and non-uniform noise patterns due to parallel imaging and B1 inhomogeneity from multiple coils. Recently deep convolutional neural networks have been developed for denoising; however, they require high-quality training data, which is difficult to obtain in practice. The networks are usually trained with the noise-corrupted images as the input and the noise-reduced/noise-free images as the output. The input can be simulated from the output images by adding noise at one or multiple levels with the desired distribution or from actual images acquired with low SNR. The DCNN can then learn from the "examples" to achieve good denoising when the new images are similar to those in the training dataset. In addition to its improved performance, the DCNN is also much faster to run as only one forward pass is required once it is trained.

In clinical practice, a clear MRI with high signal to noise ratio (SNR) is usually favored for accurate lesion detection and diagnosis. Improving the SNR of MRI can be achieved by changing the parameters of acquisition sequences such as using more averages and lower bandwidth; however, this often comes with prolonged scan time. On the contrary, improving SNR with denoising algorithms during post-processing would not change the scan process and therefore is an attractive alternative option. Most of the denoising algorithms can be categorized as traditional filter-based methods and learning-based methods. Filter-based methods, including non-local means (NLM) [1] and block-matching and 3D filtering (BM3D) [2], often rely on repetitive structures in the images so that local or global averages can be applied to reduce noise. The main disadvantages of these methods include the following: 1) a large number of similar structures need to exist in the input images to achieve good performance, which can become problematic for fine structures and pathological regions as fewer such blocks exist; and 2) the performance is highly dependent on algorithm parameters, which can vary significantly for different sequences and noise levels, especially when advanced image acquisition methods, such as parallel imaging with multiple receiver coils, are used, as the noise distribution is much more complicated.

Now with reference to prior art FIG. 3, a U-Net is a convolutional neural network architecture. U-Nets may be effective for tasks where the output is of similar size as the input and the output needs a similar level of spatial resolution. This makes a U-Net effective for super resolution image processing. To perform classification using a convolutional neural network the image is down-sampled into one or more classifications using a series of stride two convolutions reducing the grid size each time. To be able to output a generated image of the same size as the input, or larger, an up-sampling path is used to increase the grid size.

The up-sampling/decoder path may include several transposed convolutions can be used, where each transposed convolution adds pixels between and around the existing pixels. Each up-sample in the decoder/up-sampling part of the network can add pixels around the existing pixels and also between the existing pixels to eventually reach the desired resolution. Replication padding is then performed to provide an extra pixel around the image. Then average pooling can be performed to extract features smoothly. After new pixels are added, the subsequent convolutions can improve the level of detail as the path continues through the decoder path of the network an upscaling step increases the dimensions of the image.

The 3D UNet was originally proposed by Cicek et al. [8] for automatic segmentation of *Xenopus* (a highly aquatic frog) kidney. It has an encoder-decoder style architecture with skip connections between corresponding layers in encoding and decoding paths. This architecture is very popular for medical image segmentation. FIG. 3 shows the block representation of 3D UNet architecture.

Each convolutional block has two convolutions followed by max pooling. Every convolution is immediately followed by a rectified linear unit (ReLU) activation and batch normalization layer. Each deconvolutional block consists of two convolutions followed by a deconvolution to regain spatial dimension. Moreover, there are skip connections from the encoding path to decoding path at corresponding spatial dimensions. These are shown by green arrows. The very final convolution generates a three-dimensional feature map and is followed by activation in order to obtain a pseudo-random probability distribution at each pixel representing its class membership.

Deep convolutional neural networks (DCNN) with various architectures have yielded performance superior to traditional methods [3]. These networks are usually trained with the noise-corrupted images as the input and the noise-free images as the target output. The DCNN can then learn from the "examples" to achieve good denoising when the new images are similar to those in the training data. However, a disadvantage is the sole reliance on the training data, or good "examples", which are difficult to obtain in practice. Simulating low SNR images by adding noise often uses a very simplified noise model with a spatially uniform Gaussian or Rician distribution, and thus cannot represent more complicated cases with non-uniform noise from multiple coils. Acquiring paired low and high SNR images can overcome this issue but suffers from any mismatches between the two acquisitions. As the number of training examples from each sequence type may need to be large and diverse to obtain good performance, the data collection can be challenging and expensive. Furthermore, if a sequence type is not in the training set, it is doubtful whether the model can generalize to this sequence. In order to solve the problem of over-dependence on training data, an unsupervised deep convolutional neural network (U-DCNN) that does not require training from "examples" but relies on different characteristics of the network against signal and noise was recently proposed and produced compelling results on denoising natural images [4].

SUMMARY

Other aspects and features according to the example embodiments of the present disclosure will become apparent to those of ordinary skill in the art, upon reviewing the following detailed description in conjunction with the accompanying figures.

In one embodiment, a computer-implemented method of denoising a magnetic resonance (MR) image includes acquiring complex magnetic resonance (MR) image data of an area of interest of a subject, wherein the image data includes complex noisy input images of multi-coil MR image data, and wherein the complex noisy input images comprise noise data and noise free image data. For each of the noisy input images, the method includes running an iteration of a complex convolution to a converging sequence with a complex de-noising convolutional neural network (C-DnCNN). In each iteration, the method includes updating parameter settings used in calculating a series of image feature sets with the C-DnCNN, and the image feature sets predict a respective residual image from the complex noisy input images. The complex noisy input images also include a corresponding latent clean image. The method includes removing a final latent clean image from the complex noisy input images.

In another non-limiting embodiment for denoising a magnetic resonance (MR) image, a system may include one or more processors and a memory device coupled to the one or more processors and storing instructions which, when executed by the one or more processors, cause the system to perform functions that include acquiring complex magnetic resonance (MR) image data of an area of interest of a subject, wherein the image data includes complex noisy input images of multi-coil MR image data, and wherein the complex noisy input images comprise noise data and noise free image data. For each of the noisy input images, the system may include using the instructions for running an iteration of a complex convolution to a converging sequence with a complex de-noising convolutional neural network (C-DnCNN). In each iteration, the system updates parameter settings used in calculating a series of image feature sets with the C-DnCNN, and the image feature sets predict a respective residual image from the complex noisy input images, relative to a corresponding latent clean image. The system may be configured to remove a final latent clean image from the noisy input images.

In another embodiment, a non-transitory computer-readable medium stores instructions thereon which, when executed by one or more processors, cause a computer to perform functions for denoising a magnetic resonance (MR) image that include acquiring complex magnetic resonance (MR) image data of an area of interest of a subject, wherein the image data includes complex noisy input images of multi-coil MR image data, and wherein the complex noisy input images include noise data and noise free image data. For each of the noisy input images, the instructions are configured for running an iteration of a complex convolution to a converging sequence with a complex de-noising convolutional neural network (C-DnCNN). In each iteration, the instructions update parameter settings used in calculating a series of image feature sets with the C-DnCNN, and the image feature sets predict a respective residual image from the complex noisy input images, relative to a corresponding latent clean image. The instructions are further configured for removing a final latent clean image from the noisy input images.

BRIEF DESCRIPTION OF THE DRAWINGS

Reference will now be made to the accompanying drawings, which are not necessarily drawn to scale.

FIG. 7 shows low-field in vivo images obtained with different NAs and corresponding ℂDnCNN outputs. C DnCNN outputs show higher SNRs for WM, GM, and CSF, even with NA=1.

FIG. 12A shows a signal to noise ratio analysis of white matter brain images of both original MR images and images subject to the complex de-noising convolutional neural network according to this disclosure.

FIG. 12B shows a signal to noise ratio analysis of gray matter brain images of both original MR images and images subject to the complex de-noising convolutional neural network according to this disclosure.

FIG. 12C shows a signal to noise ratio analysis of cerebral spinal fluid images of both original MR images and images subject to the complex de-noising convolutional neural network according to this disclosure.

(FIG. 14B) Representative magnitude image results of different denoising methods. Top left is the ground truth image, and bottom left is the simulated noise-corrupted image with a noise standard deviation of 0.06.

(FIG. 15B) Procedures for generating the brain mask to eliminate the impact of background random phase in metric calculation. (FIG. 15C) Representative phase image results of different methods. Top left is the ground truth image, and top center is the simulated noise-corrupted image with a noise standard deviation of 0.06. Bottom row is the output of DnCNN, ℂDnCNN, and non-blind ℂDnCNN, from left to right.

(FIG. 19B) Representative image results of different denoising methods. Top left is the original noisy image acquired with NA of 3.

FIG. 21 shows a table of the computational cost of different algorithms for denoising one slice with size 320×320. NLM and BM3D were tested only on CPU.

DETAILED DESCRIPTION

Figure 1:
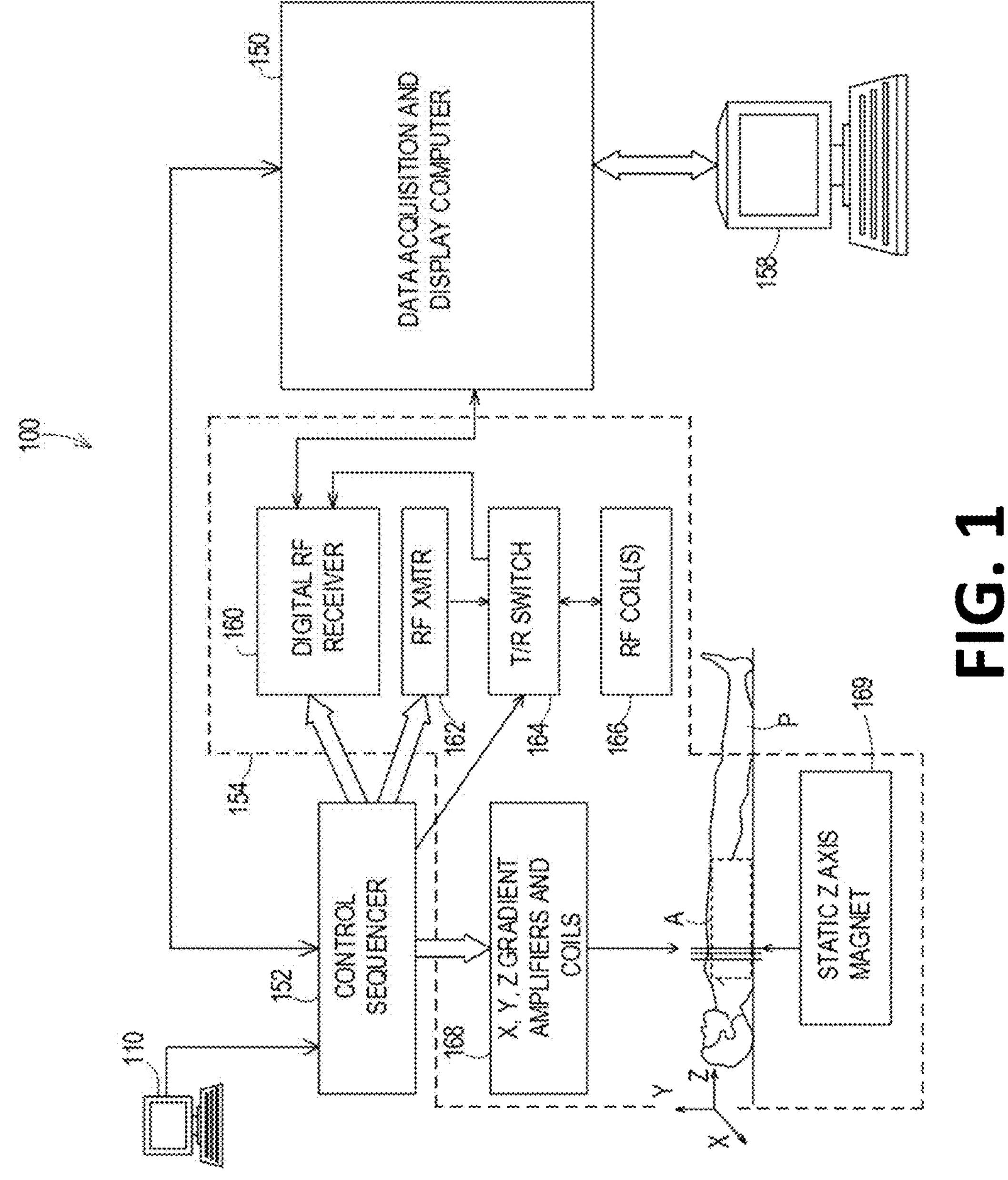
FIG. 1 is a system diagram illustrating an operating environment capable of implementing aspects of the present disclosure.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

As discussed herein, a “subject” (or “patient”) may be any applicable human, animal, or other organism, living or dead, or other biological or molecular structure or chemical environment, and may relate to particular components of the subject, for instance specific organs, tissues, or fluids of a subject, may be in a particular location of the subject, referred to herein as an “area of interest” or a “region of interest.”

Some references, which may include various patents, patent applications, and publications, are cited in reference lists and discussed in the disclosure provided herein. The citation and/or discussion of such references is provided merely to clarify the description of the present disclosure and is not an admission that any such reference is “prior art” to any aspects of the present disclosure described herein. In terms of notation, “[n]” corresponds to the $n^{th}$ reference in the list. For example, “[3]” refers to the $3^{rd}$ reference in the list, namely Zhang, K., Zuo, W., Chen, Y., Meng, D., Zhang, L.: Beyond a Gaussian Denoiser: Residual Learning of Deep CNN for Image Denoising. IEEE Transactions on Image Processing. 26, 3142-3155 (2017). All references cited and discussed in this specification are incorporated herein by reference in their entireties and to the same extent as if each reference was individually incorporated by reference.

A detailed description of aspects of the present disclosure, in accordance with various example embodiments, will now be provided with reference to the accompanying drawings. The drawings form a part hereof and show, by way of illustration, specific embodiments and examples. In referring to the drawings, like numerals represent like elements throughout the several figures. Some experimental data are presented herein for purposes of illustration and should not be construed as limiting the scope of the present disclosure in any way or excluding any alternative or additional embodiments.

FIG. 1 is a system diagram illustrating an operating environment capable of implementing aspects of the present disclosure in accordance with one or more example embodiments. FIG. 1 illustrates an example of a magnetic resonance imaging (MRI) system 100, including a data acquisition and display computer 150 coupled to an operator console 110, an MRI real-time control sequencer 152, and an MRI subsystem 154. The MRI subsystem 154 may include XYZ magnetic gradient coils and associated amplifiers 168, a static Z-axis magnet 169, a digital RF transmitter 162, a digital RF receiver 160, a transmit/receive switch 164, and RF coil(s) 166. The MRI subsystem 154 may be controlled in real time by control sequencer 152 to generate magnetic and radio frequency fields that stimulate magnetic resonance phenomena in a living subject, patient P, to be imaged. A contrast-enhanced image of an area of interest A of the patient P may be shown on display 158. The display 158 may be implemented through a variety of output interfaces, including a monitor, printer, or data storage.

The area of interest “A” corresponds to a region associated with one or more physiological activities in patient “P”. The area of interest shown in the example embodiment of FIG. 1 corresponds to a chest region of patient “P”, but the area of interest for purposes of implementing aspects of the disclosure presented herein is not limited to the chest area. It should be recognized and appreciated that the area of interest can be one or more of a brain region, heart region, and upper or lower limb regions of the patient “P”, for example.

It should be appreciated that any number and type of computer-based medical imaging systems or components, including various types of commercially available medical imaging systems and components, may be used to practice certain aspects of the present disclosure. Systems as described herein with respect to example embodiments are not intended to be specifically limited to magnetic resonance imaging (MRI) implementations or the particular system shown in FIG. 1.

One or more data acquisition or data collection steps as described herein in accordance with one or more embodiments may include acquiring, collecting, receiving, or otherwise obtaining data such as imaging data corresponding to an area of interest. By way of example, data acquisition or collection may include acquiring data via a data acquisition device, receiving data from an on-site or off-site data acquisition device or from another data collection, storage, or processing device. Similarly, data acquisition or data collection devices of a system in accordance with one or more embodiments of the present disclosure may include any device configured to acquire, collect, or otherwise obtain data, or to receive data from a data acquisition device within the system, an independent data acquisition device located on-site or off-site, or another data collection, storage, or processing device.

Figure 2:
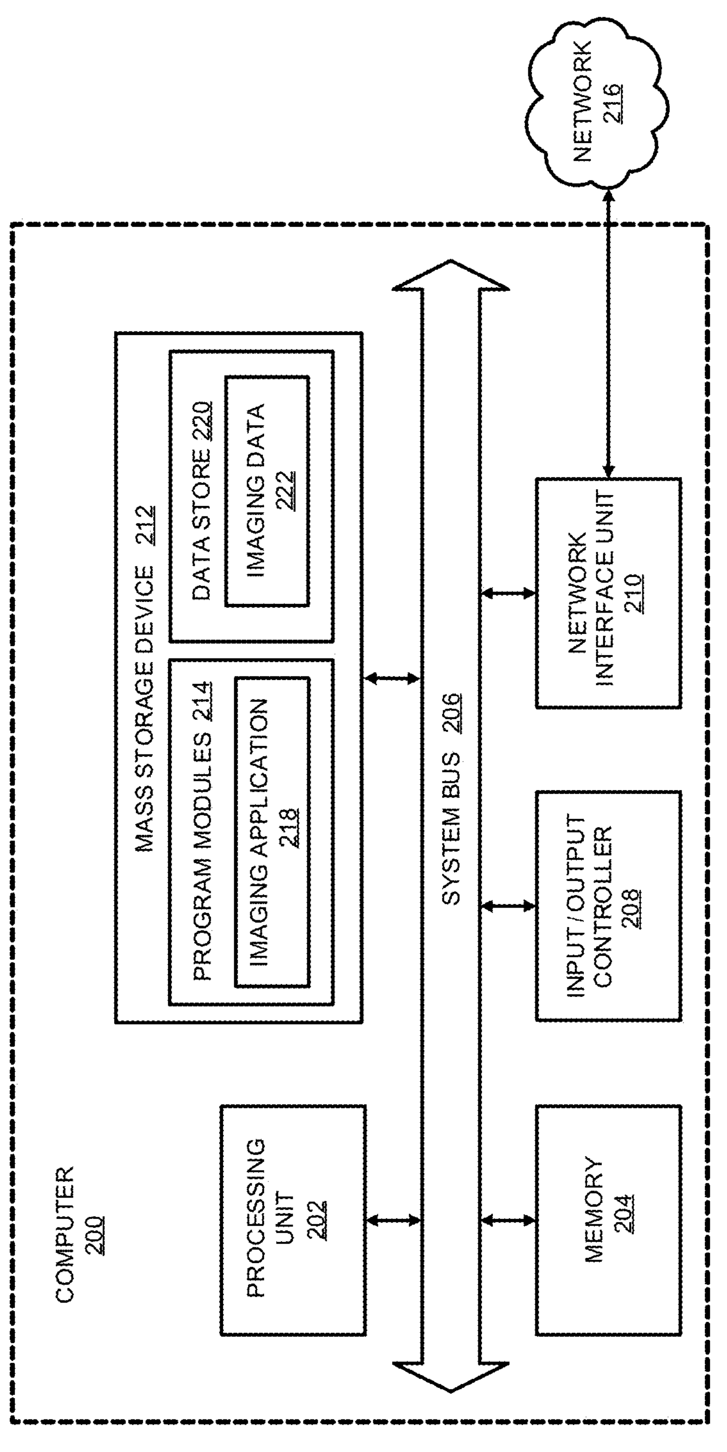
FIG. 2 is a computer architecture diagram showing a general computing system capable of implementing aspects of the present disclosure.

FIG. 2 is a computer architecture diagram showing a general computing system capable of implementing aspects of the present disclosure in accordance with one or more embodiments described herein. A computer 200 may be configured to perform one or more functions associated with embodiments of this disclosure. For example, the computer 200 may be configured to perform operations for denoising MR images as described herein with respect to certain embodiments. It should be appreciated that the computer 200 may be implemented within a single computing device or a computing system formed with multiple connected computing devices. The computer 200 may be configured to perform various distributed computing tasks, which may distribute processing and/or storage resources among the multiple devices. The data acquisition and display computer 150 and/or operator console 110 of the system shown in FIG. 1 may include one or more systems and components of the computer 200.

As shown, the computer 200 includes a processing unit 202 (“CPU”), a system memory 204, and a system bus 206 that couples the memory 204 to the CPU 202. The computer 200 further includes a mass storage device 212 for storing program modules 214. The program modules 214 may be operable to perform one or more functions associated with embodiments of method as illustrated in one or more of the figures of this disclosure, for example to cause the computer 200 to perform operations of the present disclosure as described below. The program modules 214 may include an imaging application 218 for performing data acquisition functions as described herein, for example to receive image data corresponding to magnetic resonance imaging of an area of interest. The computer 200 can include a data store

220 for storing data that may include imaging-related data 222 such as acquired image data, and a modeling data store 224 for storing image modeling data, or other various types of data utilized in practicing aspects of the present disclosure.

The mass storage device 212 is connected to the CPU 202 through a mass storage controller (not shown) connected to the bus 206. The mass storage device 212 and its associated computer-storage media provide non-volatile storage for the computer 200. Although the description of computer-storage media contained herein refers to a mass storage device, such as a hard disk or CD-ROM drive, it should be appreciated by those skilled in the art that computer-storage media can be any available computer storage media that can be accessed by the computer 200.

By way of example, and not limitation, computer-storage media (also referred to herein as a "computer-readable storage medium" or "computer-readable storage media") may include volatile and non-volatile, removable and non-removable media implemented in any method or technology for storage of information such as computer-storage instructions, data structures, program modules, or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 200. Transitory signals are not "computer-storage media", "computer-readable storage medium" or "computer-readable storage media" as described herein.

According to various embodiments, the computer 200 may operate in a networked environment using connections to other local or remote computers through a network 216 via a network interface unit 210 connected to the bus 206. The network interface unit 210 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems. The computer 200 may also include an input/output controller 208 for receiving and processing input from a number of input devices. Input devices may include one or more of keyboards, mice, stylus, touchscreens, microphones, audio capturing devices, or image/video capturing devices. An end user may utilize such input devices to interact with a user interface, for example a graphical user interface, for managing various functions performed by the computer 200.

The bus 206 may enable the processing unit 202 to read code and/or data to/from the mass storage device 212 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state or may include rotating media storing magnetically-encoded information. The program modules 214, which include the imaging application 218, may include instructions that, when loaded into the processing unit 202 and executed, cause the computer 200 to provide functions associated with embodiments illustrated herein. The program modules 214 may also provide various tools or techniques by which the computer 200 may participate within the overall systems or operating environments using the components, flows, and data structures discussed throughout this description.

In general, the program modules 214 may, when loaded into the processing unit 202 and executed, transform the processing unit 202 and the overall computer 200 from a general-purpose computing system into a special-purpose computing system. The processing unit 202 may be constructed from any number of transistors or other discrete circuit elements, which may individually or collectively assume any number of states. More specifically, the processing unit 202 may operate as a finite-state machine, in response to executable instructions contained within the program modules 214. These computer-executable instructions may transform the processing unit 202 by specifying how the processing unit 202 transitions between states, thereby transforming the transistors or other discrete hardware elements constituting the processing unit 202.

Encoding the program modules 214 may also transform the physical structure of the computer-storage media. The specific transformation of physical structure may depend on various factors, in different implementations of this description. Examples of such factors may include but are not limited to the technology used to implement the computer-storage media, whether the computer storage media are characterized as primary or secondary storage, and the like. For example, if the computer-storage media are implemented as semiconductor-based memory, the program modules 214 may transform the physical state of the semiconductor memory, when the software is encoded therein. For example, the program modules 214 may transform the state of transistors, capacitors, or other discrete circuit elements constituting the semiconductor memory.

As another example, the computer-storage media may be implemented using magnetic or optical technology. In such implementations, the program modules 214 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Commercially available medical imaging systems and components, may be used to practice certain aspects of the present disclosure. These commercially available imaging systems include 1.5 T and 3 T MRI scanners.

Figure 3A:
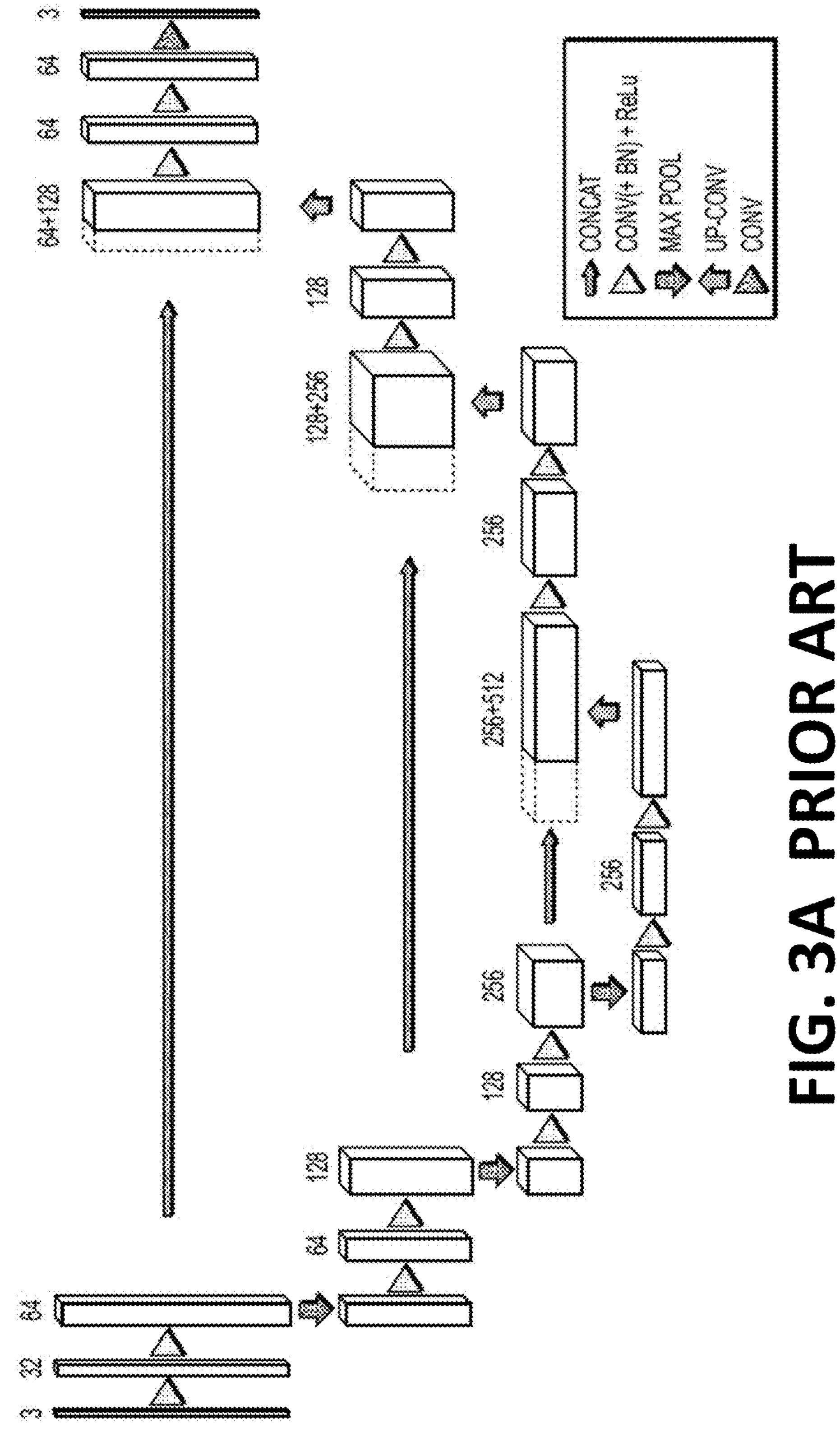
FIG. 3A is a PRIOR ART schematic that illustrates a conventional U-Net.

FIG. 3A has been used previously in U.S. Pat. Pub. No. 2022/0188602 (Meyer), which is incorporated by reference in its entirety. With reference to background FIG. 3A, a schematic of a U-Net is shown. The boxes represent feature maps, and the number of channels is labelled on each feature map. Neural network operations set forth in the legend of FIG. 3A, including convolution and max pooling, are represented by arrows between each feature map.

Some embodiments of the present disclosure may also include an Unsupervised Deep Convolutional Neural Network (U-DCNN) with structural improvements specifically for denoising MRIs. Some embodiments of the present disclosure only require a noisy MRI to be denoised as the input and functions as a traditional filter so that no simulated or acquired high-quality training data is needed. Instead of relying on averaging, the U-DCNN* uses a DCNN structure and therefore is more robust in denoising performances and maintaining fine structures, especially for non-uniform noise in a clinical MR image. Embodiments of the present disclosure include different network designs with a variety of input images, network depths, and skip-connections.

The structure and hyper-parameters of the U-DCNN can be optimized for brain MRI. Embodiments of the present disclosure have been validated with a simulated brain MRI dataset at various noise levels and an acquired dataset with parallel imaging. Comparisons with non-local means (NLM) and block-matching and 3D filtering (BM3D) were made, demonstrating a superior and more robust performance over the traditional filter-based methods, especially on the acquired MRI with non-uniform noise.

According to some embodiments of the present disclosure, the U-DCNN is a deep generator network, which can be regarded as a highly non-linear parametric function $x=f_\theta(z)$ that maps an input z to a denoised image x. The parameters θ can be comprised of the weights and bias of the network's filtering operations including convolutions, up-sampling and non-linear activation functions. The final set of parameters can be obtained using an optimizer such as gradient descent and a loss function, starting from a random parameter initialization. As discussed in [4], such a network structure has high impedance to noise and low impedance to signal. In other words, when generating x, it is much easier to obtain the parameter set for an image than random noise, as the patterns in an image can make the generation process more convenient. For natural images, U-DCNN 600 has demonstrated a faster convergence towards naturally-looking images than corrupted noisy images [4].

The denoising performance can be different between MRI and natural images because: 1) MRI has different image characteristics, 2) the fine structural details, such as small lesions, matter more in MRI, and 3) MRI noise is usually more complex than the uniform Gaussian noise on natural images, especially with multiple receiver coils. In order to study the denoising capability of U-DCNN on MRI, the generation process for the synthetic noise-free brain MRI, Rician noise itself and noisy MRI using the mean squared error (MSE) between the output of U-DCNN and the specific target was examined.

According to some embodiments of the present disclosure, the method for denoising images includes acquiring MR image data 160 of the area of interest A of the subject P and processing that data using a U-DCNN to remove the noise. The area of interest A may include at least a part of the brain of the subject P or patient. Embodiments of the present disclosure may be used to denoise images produced by magnetic resonance angiography, diffusion MRI, perfusion MRI, or other medical imaging techniques. The noise data can comprise non-uniform noise originating from coils 168 used in multi-band MR image acquisitions. The noisy input images input to the system can be previously calculated as diagnostic compilations of acquired image data from parallel channels, and the diagnostic compilations can include calculated images showing the subject P or patient's apparent diffusion coefficient, cerebral blood flow and cerebral blood volume. The high SNR image data can include MR image data 160 acquired during different MRI sequences, including the T1, T2, and PD sequences.

Noisy input images can include noise data and noise-free image data. According to some embodiments of the present disclosure, the noisy input images are processed by running iterations of a converging sequence in the U-DCNN, and updating the parameter settings used in calculating a series of image feature sets with the U-DCNN. The parameter settings can be updated in each iteration of the converging sequence. The converging sequence of the U-DCNN can be terminated before the feature sets predict an output image that replicates the noise data from the noisy input image. According to some embodiments of the present disclosure, a denoised MR image of the area of interest A can be output based on the selected features set.

Embodiments of the present disclosure may be applied to 2D images, 3D images, or both. Embodiments of the present disclosure applied to 3D images can use the additional spatial information from the through-plane dimension that is not present in a 2D image. The acquired MR image data 160 may include multi-slice or 3D acquisition. For example, a slice-wise sliding window technique using 3D convolutions can be used. For brain MRI with multi-slice 2D or 3D acquisitions, the spatial information along the through-plane dimension can be integrated to improve the performance [39A]. Replacing the 2D convolutions with 3D convolutions in the unsupervised DCNN can change it to a 3D network. According to some embodiments of the present disclosure, the network can take the entire 3D stack as an input. However, according to some embodiments of the present disclosure, a slice-wise sliding window can be used by reconstructing a small number of slices (e.g. 8) together and sliding to the next stack when one stack finishes denoising. Using a slice-wise sliding window method can avoid the greatly increased computation and memory requirements of a network that takes the entire 3D stack as a single input. The network structure on the slice dimension will also be greatly simplified to limit the extra computations. To further accelerate the algorithm, which will become more of a bottleneck when there are a large number of slices in one scan, ShuffleNet [33] can be used. ShuffleNet divides the convolutions along the feature dimension into smaller groups and performs a two-step process to first run convolutions within groups and then summarizes the output from different groups. ShuffleNet has shown advantages in computation speed with minimal or no loss of accuracy.

As the unsupervised DCNN is used for denoising, the requirement for collecting a large dataset for training and validation is alleviated. However, a decent-sized validation dataset that uses a variety of sequences and acquisition strategies is still necessary. To evaluate the algorithm against a noise-free gold standard and compare with other methods, an open source simulated brain database (BrainWeb) [34A-38A] that includes T1, T2 and PD weighted images at a variety of slice thicknesses, noise levels, and levels of intensity non-uniformity may be used. It also includes both a normal brain and a brain with MS lesions.

Figure 3B:
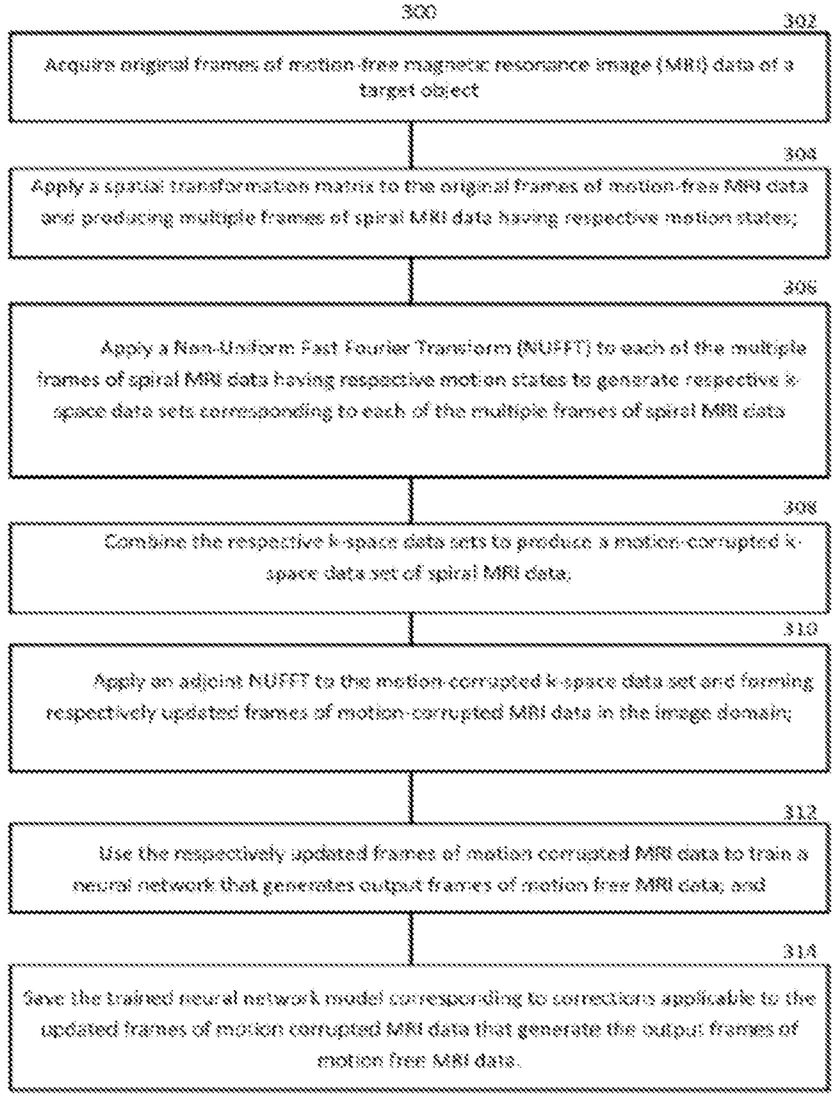
FIG. 3B is a flow chart illustrating steps to correct motion corruption from MRI images.

FIG. 3B has been used previously in U.S. Pat. Pub. No. 2022/0373630 (Dou), which is incorporated by reference in its entirety. With reference to FIG. 3B, a method 300 for training a neural network to correct motion-induced artifacts in magnetic resonance images is shown.

At step 302, the method can include acquiring original spirally-sampled frames of motion-free magnetic resonance image (MRI) data of a target object. The images can be images that were acquired using any method, including using both conventional MRI sampling and spiral MRI sampling.

In some embodiments of the present disclosure, the method 300 can also include augmenting the original frames of motion free MRI data to form augmented frames of motion free MRI data in the image domain. The augmentation can include applying different transforms to the original frames. Non-limiting examples of transforms that can be applied in embodiments of the present disclosure include applying in-plane rotations, horizontal flips, and/or vertical flips to the original frames. In some embodiments of the present disclosure, the augmented frames of motion-free MRI data and the respectively updated frames of motion-corrupted MRI data can be saved in a computer. As a non-limiting example, the augmented frames and the respectively updated frames can be saved in the image domain format.

At step 304, a spatial transformation matrix can be applied to the original frames of the motion-free MRI data to produce multiple frames of spiral MRI data having respective motion states.

At step 306, a non-uniform Fast Fourier Transform (NUFFT) can be applied to each of the multiple frames of spiral MRI data having respective motion states to generate respective k-space data sets corresponding to each of the multiple frames of spiral MRI data having respective motion states.

At step 308, the respective k-space data sets can be combined. The combination of the respective K-space datasets can produce a motion-corrupted k-space data set of spiral MRI data.

At step 310, an adjoint NUFFT can be applied to the motion-corrupted k-space data set and respectively updated frames of motion-corrupted MRI data in the image domain can be formed.

At step 312, a neural network can be trained that generates output frames of motion free MRI data using the respectively updated frames of motion corrupted MRI data. In some embodiments of the present disclosure, step 312 can include training a generative adversarial network with augmented frames of motion-free MRI data and the respectively updated frames of motion-corrupted MRI data. As a non-limiting example, training the generative adversarial network can include applying the respectively updated frames of motion-corrupted MRI data to a generator in the generative adversarial network to produce respective motion compensated images accessible by a discriminator in the generative adversarial network. In some embodiments of the present disclosure, training the generative adversarial network can also include applying the respectively updated frames of motion-corrupted MRI data and the respective motion compensated images to a discriminator within the generative adversarial network.

In some embodiments of the present disclosure, the generative adversarial network can be trained by applying the respectively updated frames of motion-corrupted MRI data and a target motion-free image to a discriminator within the generative adversarial network. The generative adversarial network that can be trained in step 312 can also be trained to minimize or maximize a function, for example a function related to image quality. As a non-limiting example the function can be an error function and the system can be configured to minimize the error function. A non-limiting example of an error function is a function that represents the amount of error in the output images.

At step 314, the trained neural network model can be saved. The trained neural network model can correspond to corrections applicable to the updated frames of motion corrupted MRI data that generate the output frames of motion-free MRI data.

The method can train a neural network to correct motion-induced errors in magnetic resonance images.

At another step original frames of motion-free magnetic resonance image (MRI) data of a target object can be acquired.

At another step spiral interleaves for spatial transformation can be selected for each original frame of motion-free MRI data, and a respective spatial transformation matrix is applied to the selected spiral interleaves therein to produce multiple frames of spiral MRI data having respective motion states.

In some embodiments of the present disclosure, another step can include selecting spiral interleaves for spatial transformation by dividing all spiral interleaves within the original frames into a selected number of sets, wherein each set is subject to a respective motion event corresponding to a respective spatial transformation matrix.

In some embodiments of the present disclosure, applying the spatial transformation can include simulating in plane rigid motion artifacts from the original frames to produce the multiple frames of spiral MRI data having respective motion states.

In some embodiments of the present disclosure, the number of spiral interleaves in a set can randomly selected from {8, 16, 32, 64, 128}. Additionally, in some embodiments, the spatial transformation of the spiral interleaves can include a type of spiral trajectory randomly selected from constant density, variable density, and dual density transformations.

At another step a Non-uniform Fast Fourier Transform (NUFFT) can be applied to each of the multiple frames of spiral MRI data having respective motion states to generate respective k-space data sets corresponding to each of the multiple frames of spiral MRI data having respective motion states;

At another step the respective k-space data sets are combined to produce a motion-corrupted k-space data set of spiral MRI data.

At another step an adjoint NUFFT can be applied to the motion-corrupted k-space data set and respectively updated frames are formed of motion-corrupted MRI data in the image domain. In some embodiments of the present disclosure, forming the multiple frames of spiral MRI data having respective motion states can include applying in-plane horizontal and vertical translations and/or in plane rotations to the original frames of motion free MRI data.

At another step a neural network can be trained that generates output frames of motion free MRI data using the respectively updated frames of motion corrupted MRI data that generate the output frames of motion free MRI data. At step 364, data can be saved corresponding to corrections applicable to the updated frames of motion corrupted MRI data to generate the output frames of motion free MRI data.

In another non-limiting embodiment, this disclosure includes a computer-implemented method of training a neural network to correct motion-induced errors in magnetic resonance images by acquiring original frames of motion free magnetic resonance image (MRI) data of a target object. Fourier transforms are used to acquire respective original k-space data sets corresponding to each original frame. The method continues by applying a respective spatial transformation matrix to each original k-space data set to acquire motion state data for each original k-space data set. The computer then replaces portions of each original k-space data set with the motion state data to produce a transformed k-space MRI data set having a respective motion state and by combining the transformed k-space MRI data sets, the method produces a motion-corrupted k-space data set of MRI data. To return back to the image domain, the method includes applying an inverse Fourier transform to the motion-corrupted k-space data set and forming respective synthetic motion corrupted frames of MRI data. The synthetic motion corrupted frames of MRI data are used to train a neural network that generates output frames of motion compensated MRI data. Applying the spatial transformation matrix includes simulating in plane rigid motion artifacts from the original frames to produce the multiple frames of MRI data having the respective motion states. In some non-limiting embodiments, the Fourier transform is a Fast Fourier Transform and the k-space data sets are Cartesian k-space data sets.

In other non-limiting embodiments, the Fourier transform is a Non-Uniform Fourier Transform and the k-space data sets are formed on spiral k-space trajectories. Replacing portions of each original k-space data set further includes replacing selected spiral interleaves in a respective k-space data set. Replacing selected spiral interleaves may include dividing all spiral interleaves in the motion-corrupted k-space data set into a selected number of sets, wherein each set is subject to a respective motion event corresponding to a respective spatial transformation matrix. In non-limiting embodiments, a number of spiral interleaves in each of the sets is randomly selected from a group of numbers including 8, 16, 32, 64, and 128. A spatial transformation of the spiral interleaves may include a type of spiral trajectory randomly selected from constant density, variable density, and dual density transformations. The number of sets is selected from 1, 2, 3, and 4 sets.

In addition to the above noted use of convolutional neural networks, this disclosure includes using more advanced networks, particularly de-noising convolutional neural networks as set forth in reference [48A], which is incorporated herein by reference in its entirety. In the article of reference [48A], Zhang et al. ("Zhang") describes advances in de-noising convolutional neural networks with residual layer predictions. Zhang uses feed-forward, denoising convolutional neural networks (DnCNNs) to embrace the progress in very deep architecture, learning algorithms, and regularization methods for image denoising. The DnCNN model of reference [48A] is able to handle Gaussian denoising with unknown noise levels (i.e., blind Gaussian denoising) and even additive white Gaussian noise (AWGN).

Over the last few decades, various models have been exploited for modeling image priors in the context of de-noising algorithms, including nonlocal self-similarity (NSS) models. To overcome the limitations of prior-based approaches, several discriminative learning methods have been recently developed to learn image prior models in the context of truncated inference procedure. In Zhang's work of reference [48A], instead of learning a discriminative model with an explicit image prior, Zhang treats image denoising as a plain discriminative learning problem, i.e., separating the noise from a noisy image by feed-forward convolutional neural networks (CNN). Zhang explains, at page 1, the reasons for using CNN as being "three-fold." "First, CNN with very deep architecture is effective in increasing the capacity and flexibility for exploiting image characteristics. Second, considerable advances have been achieved on regularization and learning methods for training CNN, including Rectifier Linear Unit (ReLU), batch normalization and residual learning. These methods can be adopted in CNN to speed up the training process and improve the denoising performance. Third, CNN is well-suited for parallel computation on modern powerful GPU, which can be exploited to improve the run time performance. Rather than directly outputting the denoised image $\hat{x}$, the proposed DnCNN is designed to predict the residual image $\hat{v}$, i.e., the difference between the noisy observation and the latent clean image. The proposed DnCNN implicitly removes the latent clean image with the operations in the hidden layers." See reference [48A], Zhang, page 2.

Zhang contrasts "the existing deep neural network-based methods which directly estimate the latent clean image with the Zhang network that adopts the residual learning strategy to remove the latent clean image from noisy observation. The residual network explicitly learns a residual mapping for a few stacked layers. With such a residual learning strategy, extremely deep CNN can be easily trained and improved accuracy has been achieved for image classification and object detection." Ref. [48A], Zhang page 2.

Figure 4:
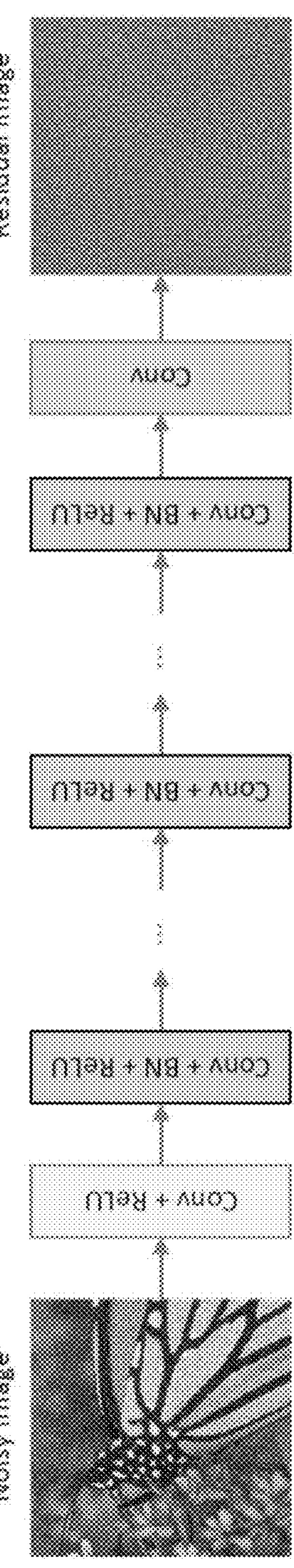
FIG. 4 is a PRIOR ART schematic that illustrates a de-noising convolutional neural network DnCNN.

FIG. 4 is a schematic of Zhang's network, which also shows that "batch normalization is proposed to alleviate the internal covariate shift by incorporating a normalization step and a scale and shift step before the nonlinearity in each layer. For batch normalization, only two parameters per activation are added, and they can be updated with back-propagation." Reference [48A], Zhang page 3. Zhang describes the deep architecture of FIG. 4 as a "DnCNN with depth D, [and] three types of layers . . . . (i) Conv+ReLU: for the first layer, 64 filters of size 3×3×c are used to generate 64 feature maps, and rectified linear units (ReLU, max(0; •)) are then utilized for nonlinearity. Here c represents the number of image channels, i.e., c=1 for gray image and c=3 for color image. (ii) Conv+BN+ReLU: for layers 2~(D−1), 64 filters of size 3×3×64 are used, and batch normalization is added between convolution and ReLU. (iii) Conv: for the last layer, c filters of size 3×3×64 are used to reconstruct the output." Ref [48A], Zhang, page 5.

One non-limiting goal of this disclosure is to utilize the above concepts, particularly the de-noising convolutional neural networks, but to also include calculations of complex image data that includes phase information, instead of simply relying upon magnitude data or other real numeric data that represents an image. This process not only requires adjustments for the kind of data, but certain steps in the process, such as batch normalization and rectified linear units, are also adjusted as part of this disclosure.

In regard to batch normalization steps, this disclosure refers back to reference [49A] by El-Rewaidy et al. ("El Rewaidy"), which is incorporated herein in its entirety. To give proper credit to this article and for certain details of implementation, quotes are provided herein. El-Rewaidy states in its introduction that "prior works show a convolutional recurrent neural network that shares reconstruction information across different network iterations to simulate the iterative optimization process." "Deep generative networks have also been utilized to remove aliasing artifacts from magnitude MR images where the generator is trained to produce artifact-free images." "It is important however, that in MRI data collection, the phase also carries important information in MR reconstruction that cannot be ignored. While several recent studies have used complex image/k-space information as network input, these approaches process real and imaginary components of data separately, concatenated to each other, or fed into a deep convolutional network as different input channels, analogous to RGB information of a color image. However, these approaches only use a kernel in which components of the kernel are real values, which have limited capability to learn naturally acquired complex MRI data representations." El-Rewaidy states that "there is an unmet need for deep-learning reconstruction models that process MRI data in the complex domain to enable learning richer representations of the complex data. These kernels have complex weights of real and imaginary components that are adjusted with a convolutional operation incorporating both real and imaginary components of the input data and output feature maps." This disclosure particularly notes El-Rewaidy's work on batch normalization steps in the complex data domain. See reference [49A] El-Rewaidy, page 1.

"Batch normalization is important for accelerating and stabilizing the convergence of neural networks. Although the original batch normalization was proposed for real-valued networks, a generalization to the complex data was proposed by Trabelsi et al. In their complex version, the distribution of both real and imaginary components was independently shifted to have zero mean, then scaled by the covariance matrix of the real and imaginary components to ensure equal variance for the two components. However, separately shifting the distribution of each component towards zero mean induces distortion in the phase and magnitude." See reference [49A], El-Rewaidy, page 3.

In el-Rewaidy's article, for radial batch normalization, "phase information is maintained and magnitude is scaled such that relative differences are preserved between complex quantities. In radial BN, the input complex data are transformed to polar coordinates, $Z=R\ e^{i\theta}$. Standard batch normalization is applied to the magnitude data, R, to have a mean of τ and standard deviation of 1; thus, the normalized magnitude can be calculated as:

$$R_{bn} = \left(\frac{R-\mu_R}{\sqrt{\sigma_R^2+\epsilon}}\right)\gamma+\beta+\tau,$$

where μR and σ2 to R are the respective mean and variance of R, ϵ is a constant added to the variance for numerical stability, and β and γ are trainable parameters for shifting and scaling data distribution. El-Rewaidy introduce a new constant, τ, to ensure a positive value for the normalized R (τ=1 was empirically used in their experiments). The normalized complex data are transformed back to Cartesian coordinates using the normalized magnitude and the same phase, $Z=Rbn\ e^{i\theta}$." See reference [49A], El Rewaidy pages 4-5.

The advancements in complex neural networks has also required advancements in certain steps such as the rectified linear units used therein. A rectified linear unit is a process that ensures the image data remains positive during convolutions. The ReLU outputs the same value for a positive input and a zero for a negative input to expedite calculations during use of convolutional neural network. This disclosure quotes portions of reference [50A] by Trabelsi, et al. ("Trabelsi") for clarity in certain processes, including the ReLU application in a complex domain. Trabelsi, page 2, indicates "the advantages of using complex-valued representations with respect to retrieval and insertion into an associative memory. In residual networks, the output of each block is added to the output history accumulated by summation until that point." Trabelsi notes that the work in reference [50A] "incorporate[s] complex weights and activations in residual networks."

Trabelsi indicates that "the phase component is not only important from a biological point of view but also from a signal processing perspective. It has been shown that the phase information in speech signals affects their intelligibility (Shi et al., 2006). Also Oppenheim and Lim (1981) show that the amount of information present in the phase of an image is sufficient to recover the majority of the information encoded in its magnitude. In fact, phase provides a detailed description of objects as it encodes shapes, edges, and orientations." Going into detail in the complex convolution theory, Trabelsi states that "[i]n order to perform the equivalent of a traditional real-valued 2D convolution in the complex domain, [Trabelsi] convolve[s] a complex filter matrix W=A+iB by a complex vector h=x+iy where A and B are real matrices and x and y are real vectors since this disclosure is simulating complex arithmetic using real-valued entities. As the convolution operator is distributive, convolving the vector h by the filter results in W*h=(A*x−B*y)+i(B*x+A*y)." Trabelsi, page 4. As part of Trabelsi's complex convolution, Trabelsi applies a complex rectified linear unit ("ReLU") on both of the real and imaginary part of a neuron within Trabelsi's system.

This disclosure incorporates by reference the entire disclosures of the above discussed U.S. Pat. Pub. No. 2022/0188602 (Meyer), U.S. Pat. Pub. No. 2022/0373630 (Dou), and the published technical journal articles by Zhang (reference [48A]), El-Rewaidy (reference [49A]), and Trabelsi (reference [50A]. Against the back-drop of these articles and others incorporated by reference below, this disclosure adds significant improvements to all aspects of using de-noising convolutional neural networks (DnCNNs) within the domain of complex data, which would include phase information for collected image data. In general, MR images obtained at low-field inherently have low signal to noise ratios. The number of averages (NA) can be increased to maintain the same SNR, but this leads to longer scan time. Recently, and as discussed in part above, deep learning-based denoising methods have shown promising results including non-local means denoising of reference [51A], block matching and three dimensional (3D) filtering of reference [52A], and de-noising CNN as discussed above for reference [48A]. All of these references are incorporated by reference as if set forth fully herein.

MR images obtained at low-field inherently have low signal-to-noise ratio (SNR) compared to images acquired at high-field. The number of averages (NA) can be increased to maintain the same SNR, but this leads to longer scan time. Recently, deep learning-based denoising methods have shown promising results. In this work, this disclosure shows training a complex-valued convolutional neural network (CNN) with simulated data to enhance the image quality on images acquired at low-field. The disclosure includes comparing the results using the proposed method to results using state-of-the-art denoising methods.

The fastMRI dataset (https://fastmri.med.nyu.edu/) provides brain MRI data acquired at 1.5 T or 3T for T1, post-contrast T1, T2, and FLAIR modalities. Single-coil data was simulated from the multi-coil data using an emulated single-coil method. This disclosure is not limited to singe coil data, however, and computations for multi-coil data are fully incorporated into the scope of this disclosure.

In regard to developing single-coil data from multi-coil MR images, reference [55A] below, which is incorporated herein by reference, discloses a linear combination of the responses from multiple coils for the emulated single-coil (ESC) response. In reference [55A, Zbontar et al. ("Zbontar") describes using "least-squares [to] fit the complex-valued coefficients in the linear combination to the "ground-truth" reconstruction, estimating the ground truth using the canonical full multi-coil reconstruction, the root-sum square (RSS) of prior literature. Most notably, linearly combining the raw coil responses sums complex-valued fluxes directly, rather than summing nonnegative energies as in the RSS. This simulates a single-coil scanner."

Zbontar continues by stating in a quote, "given data A from multiple coils, [Zbontar] define[s] k to be the number of coils, ℓ to be the number of slices in a volume of cross-sectional images, m to be the height of each slice, and n to be the width of each slice; A then consists of an (nml)×k matrix with complex-valued entries. More precisely, the images in A are cropped inverse Fourier transforms of the original two-dimensional Fourier domain ("k-space") measurements, cropping to the center m×n block of pixels. [Zbontar] defines b to be the (nml)×1 column vector containing "ground-truth" reconstructions from the full multi-coil data; specifically, each entry of b is the Euclidean norm of the corresponding 1×k row in A. [The method includes calculating] the k×1 column vector x with complex-valued entries minimizing:

$$\left\| \sqrt{|Ax|} - \sqrt{|b|} \right\|_2^2,$$

Where ||variable|| is the Euclidean norm of the variable, the square root function takes the square root entry-wise, and |variable| takes the absolute value entry-wise, so that the absolute value of b is in fact equal to b, as the entries of b are non-negative. The subtraction shown in the formula refers to a distance function, i.e., the Hellinger metric of prior literature, and it generally represents a measure of relative errors in the data. The square roots amplify entries of small magnitude and attenuate entries of large magnitude.

The current disclosure shows randomly selecting 1200 subjects and dividing the 1200 imaging volumes such that 1000 volumes were used for training and validation, and the remaining 200 volumes were used for testing. To generate training pairs, random complex Gaussian noise was added to the images. A DnCNN as discussed above in reference [48] was used as the backbone network structure for image denoising. Instead of performing separate real-valued convolutions on real and imaginary channels, this disclosure performed complex-valued convolutions (ℂ Conv): W*d=A*x−B*y+i(B*x+A*y), where W=A+iB is a complex filter and d=x+iy is the input complex data. Batch normalization (BN) is an important operation to speed up training and stabilize the denoising performance. This disclosure adopted the radial batch normalization which scales the magnitude and maintains the phase information:

$$rBN = \left((r-\mu r) \big/ SQRT(\sigma_r^2)\right)\gamma + B + \tau,\ dBN = r_{BN}e^{i\theta} \text{ where } d = re^{i\theta}$$

is the input complex data expressed in its polar form, $\mu_r$ and $\sigma_r^2$ are the mean and variance of r; β and γ are trainable parameters; and τ is a constant to ensure the normalized $r_{BN}$ to be positive (empirically set to 1).

The rectified linear unit (ReLU) can be extended to ℂReLU by separately activating the real and imaginary parts:

$$\mathbb{C}\text{ReLU } d = ReLU\ x + iReLU\ y.$$

The network that this disclosure termed ℂDnCNN was trained to minimize the L1 loss using Adam optimizer with a learning rate of 0.00001. To avoid overfitting, this disclosure adopted random patch cropping as the training augmentation. Normalized root-mean-square error (NRMSE), peak signal-to-noise ratio (PSNR), and structural similarity index (SSIM) were calculated as image quality metrics to evaluate the network performance on the simulated test dataset. This disclosure compared the results to other methods: non-local means filtering (NLM) (reference [56A], block-matching and 3D filtering (BM3D) (reference 57A), and real-valued DnCNNs trained with magnitude input and two-channel (real and imaginary) input. This disclosure also evaluated the network performance on in vivo T2 brain images acquired on a 0.55 T scanner with a spiral-ring trajectory. SNRs for white matter (WM), gray matter (GM) and cerebral spinal fluid (CSF) were computed based on manually defined regions of interest (ROIs):

$$SNR_{ROI} = 0.66X \text{ Mean } (ROI) \div \text{Standard Deviation (Air).}$$

Figure 5:
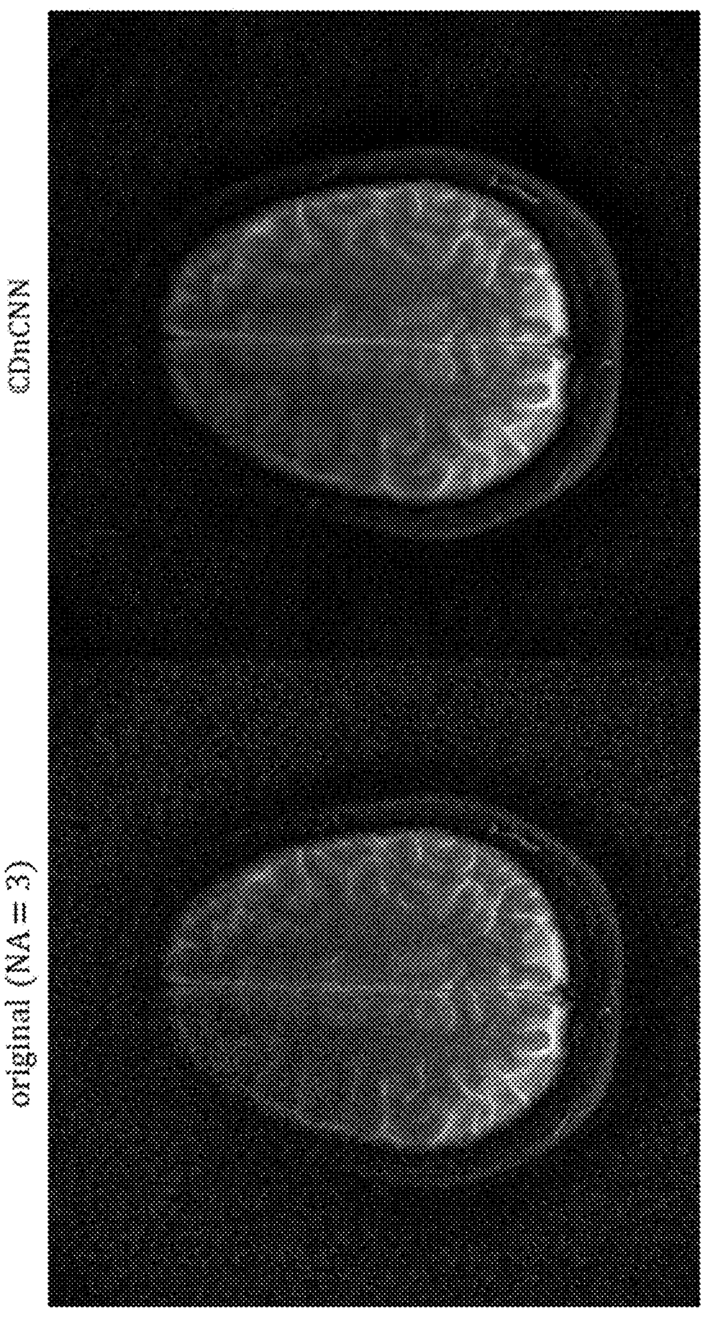
FIG. 5 shows the network performance on an in vivo brain image acquired at 0.55 T with NA=3. ℂDnCNN output shows reduced noise and improved image quality compared to the original image.
Figure 6:
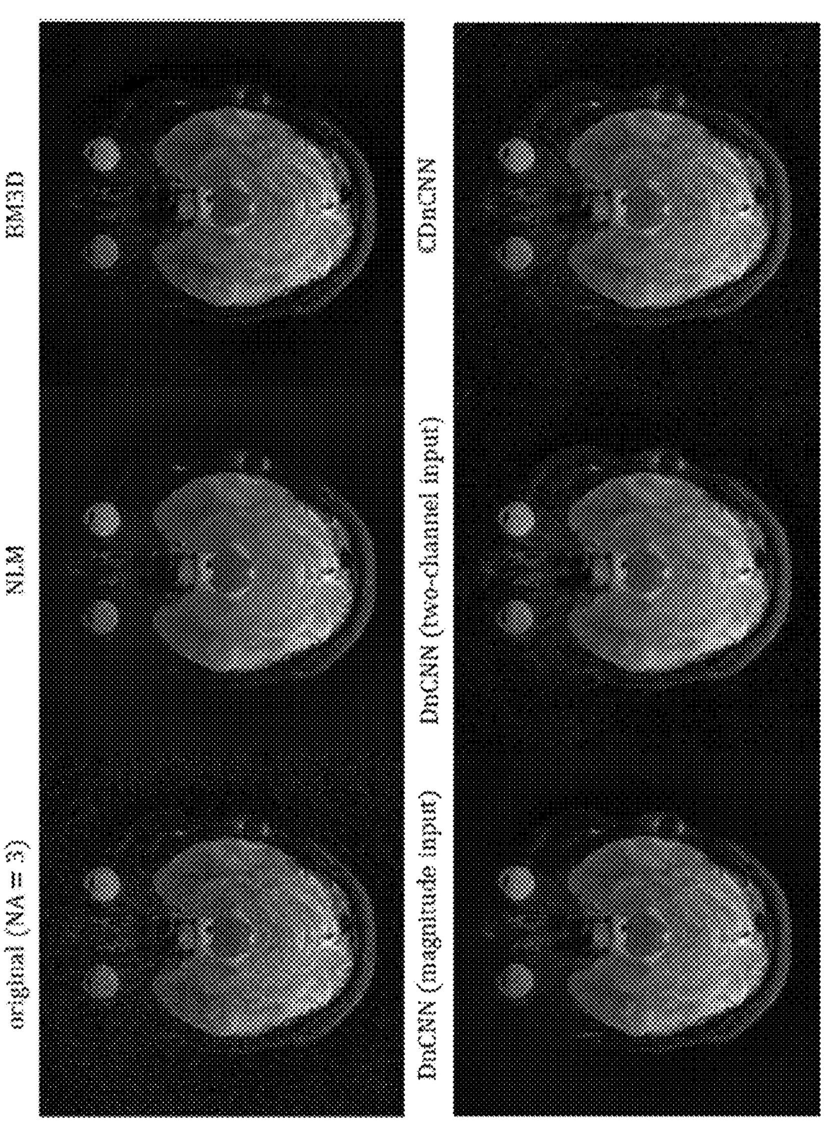
FIG. 6 shows a low-field in vivo brain image followed by denoised results using different methods.
Figure 8:
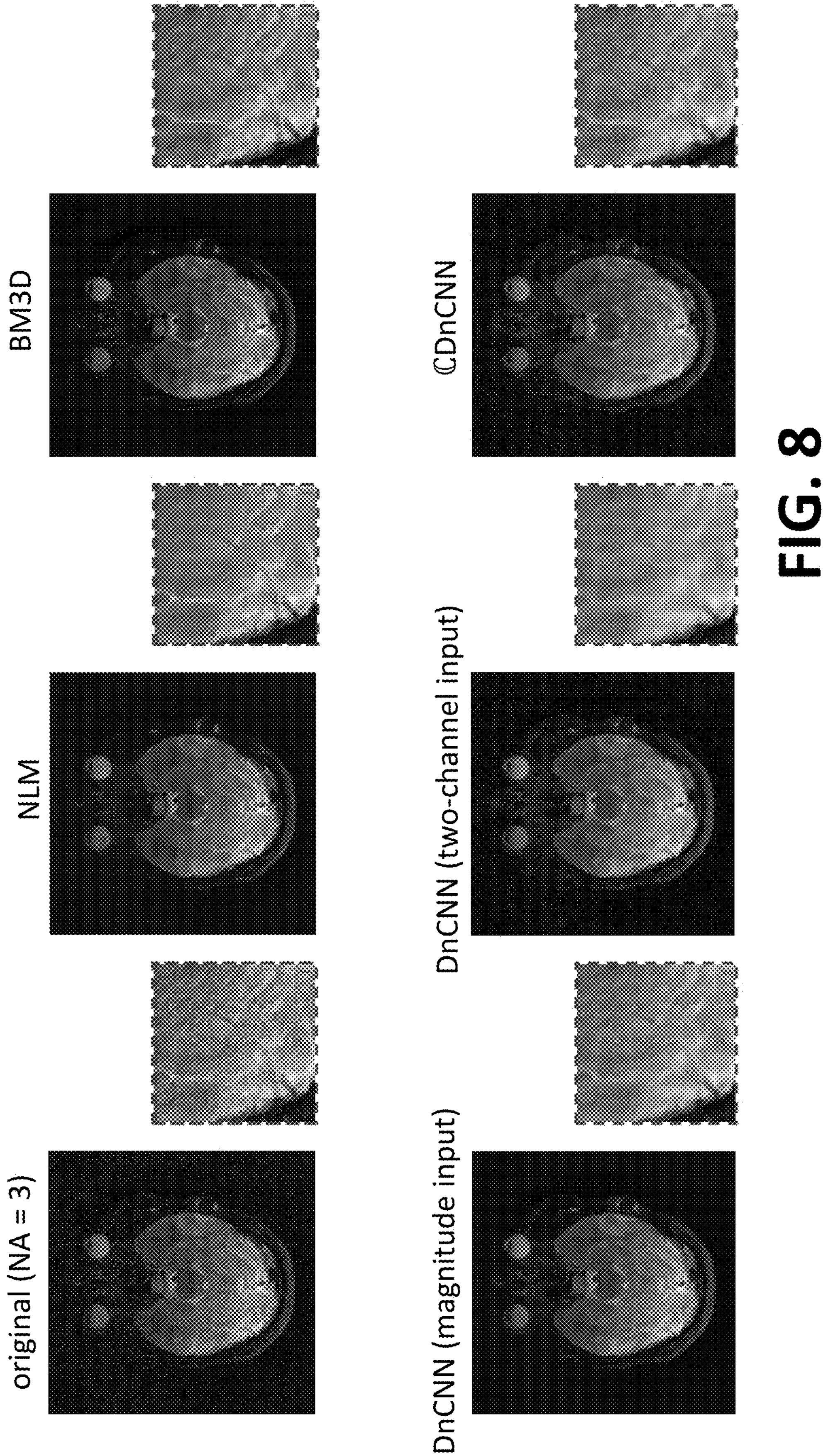
FIG. 8 shows a series of comparisons of images with cropped augmentations using numerous techniques in accordance with this disclosure.
Figure 9:
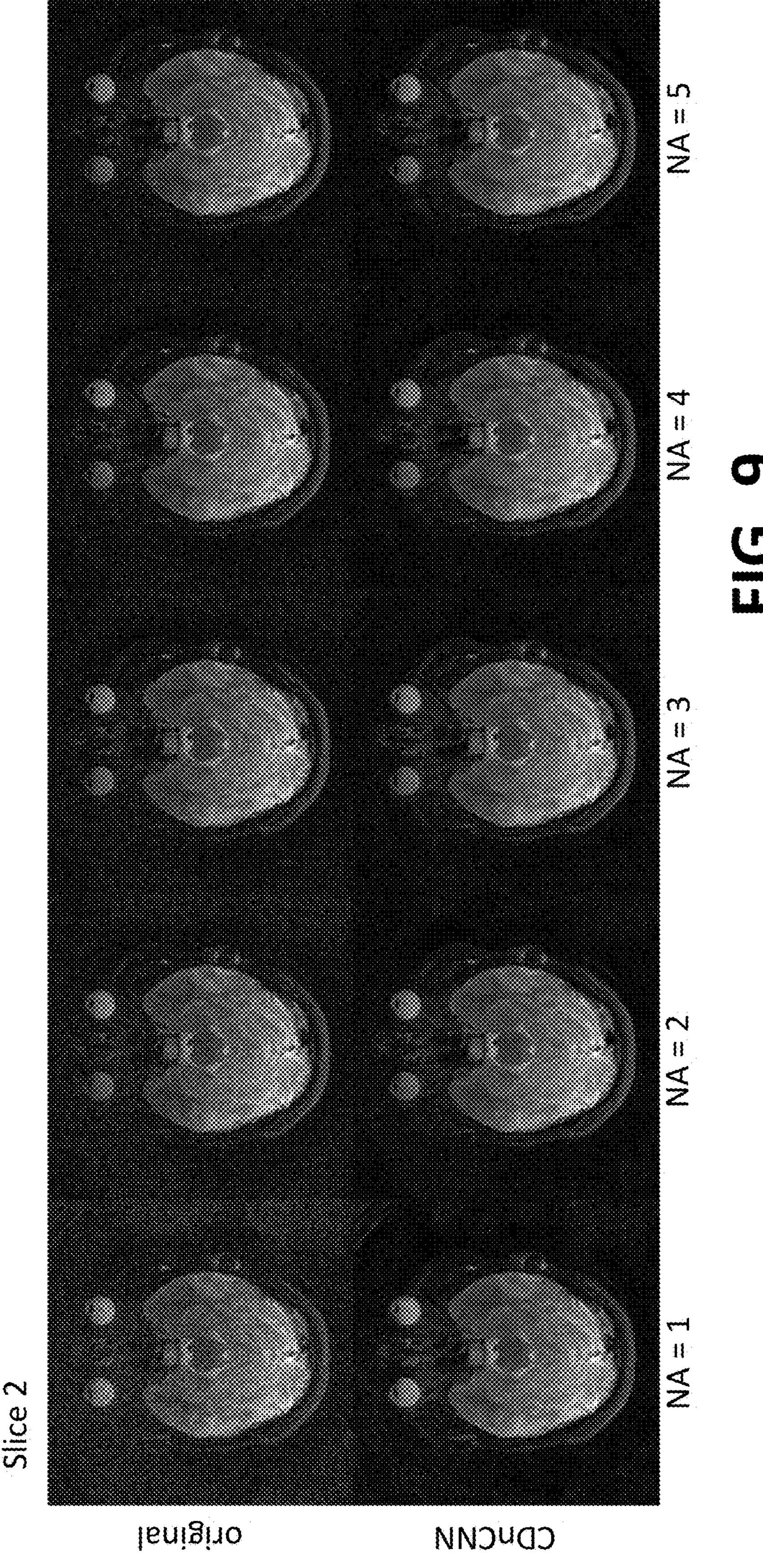
FIG. 9 shows a series of images in both original image format and subject to the complex de-noising convolutional neural network according to this disclosure.
Figure 10:
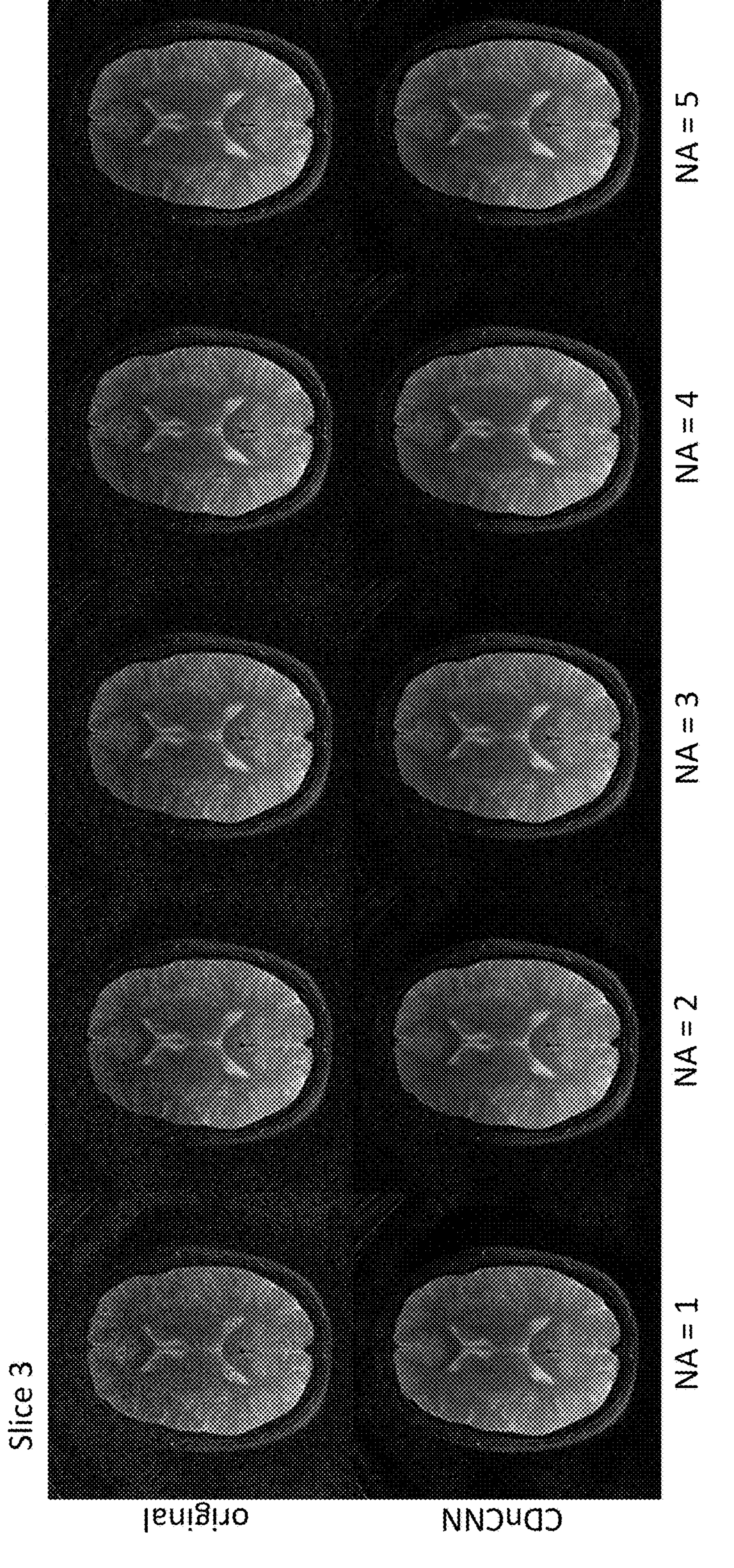
FIG. 10 shows a series of images in both original image format and subject to the complex de-noising convolutional neural network according to this disclosure.
Figure 11:
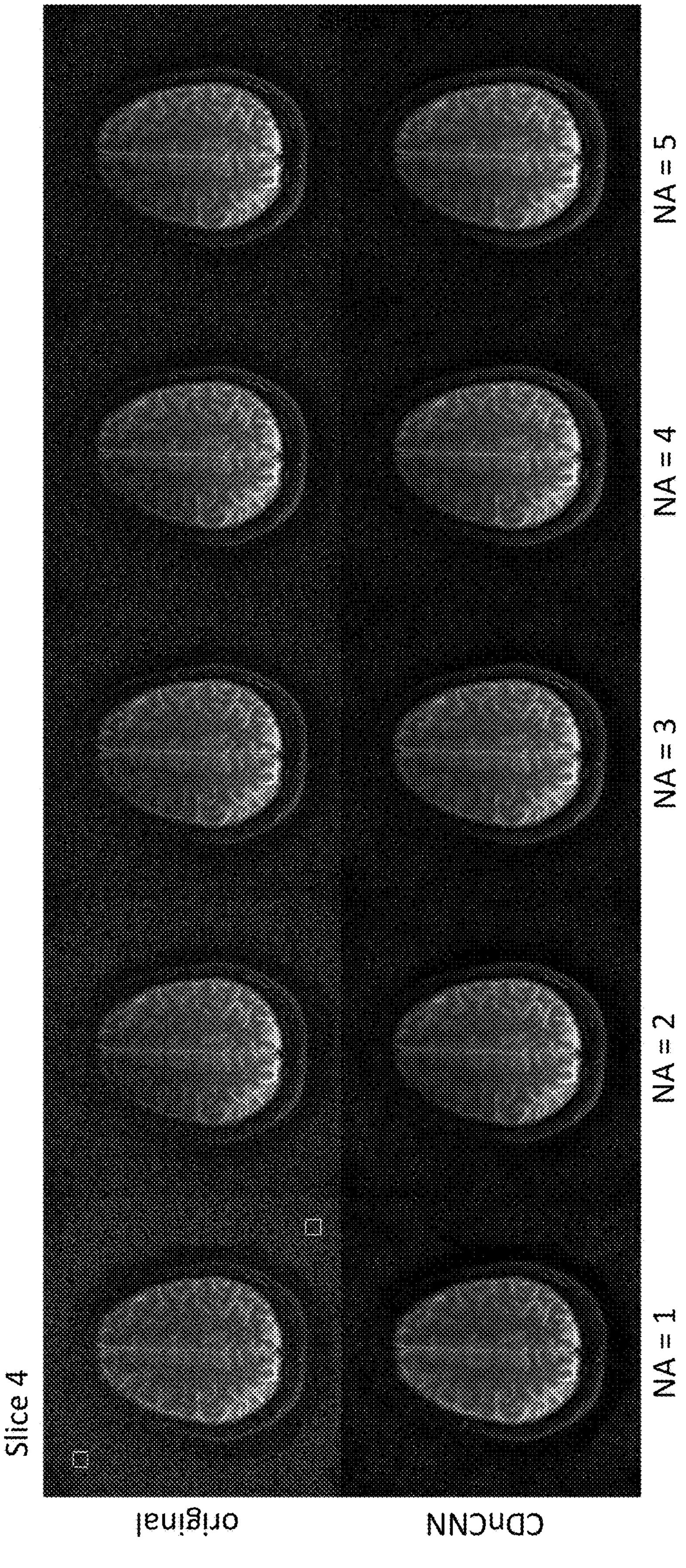
FIG. 11 shows a series of images in both original image format and subject to the complex de-noising convolutional neural network according to this disclosure.

Table 1 summarizes the quantitative evaluation results on the simulated dataset. For a fair comparison, all denoising methods were tested without GPU acceleration, and all networks have the same number of parameters. ℂDnCNN shows the lowest NRMSE and highest PSNR and SSIM. FIG. 5 shows the network performance on an in vivo brain image acquired at 0.55 T with NA=3. ℂDnCNN output shows reduced noise and improved image quality compared to the original image. FIG. 6 shows a low-field in vivo brain image followed by denoised results using different methods. FIG. 7 shows low-field in vivo images obtained with different NAs and corresponding ℂDnCNN outputs. C DnCNN outputs show higher SNRs for WM, GM, and CSF, even with NA=1.

TABLE 1

Quantitative evaluation results on simulated dataset

| | inference time/ slice (ms) | Memory usage (MB) | NRMSE | PSNR (dB) | SSIM |
|---|---|---|---|---|---|
| original | — | — | 0.47 | 20.44 | 0.4539 |
| NLM | 360 | 85 | 0.28 | 24.63 | 0.7418 |
| BM3D | 2250 | 188 | 0.23 | 26.28 | 0.8073 |
| DnCNN with magnitude input | 240 | 258 | 0.21 | 27.72 | 0.8130 |
| DnCNN with 2-channel input | 300 | 276 | 0.19 | 28.30 | 0.8386 |
| ℂDnCNN with complex input | 1520 | 337 | 0.19 | 28.40 | 0.8387 |

This work demonstrates that a deep complex-valued CNN is capable of denoising low-field MR images. The proposed ℂDnCNN outperforms real-valued DnCNN and conventional denoising methods such as NLM and BM3D.

The computer implemented method may be incorporated into software stored on a non-transitory computer-readable medium. Stored instructions, when executed by one or more processors, cause a magnetic resonance imaging system to perform a computer implemented method that includes acquiring original frames of motion free magnetic resonance image (MRI) data of a target object; using Fourier transforms to acquire respective original k-space data sets corresponding to each original frame; applying a respective spatial transformation matrix to each original k-space data set to acquire motion state data for each original k-space data set; replacing portions of each original k-space data set with the motion state data to produce a transformed k-space MRI data set having a respective motion state; combining the transformed k-space MRI data sets to produce a motion-corrupted k-space data set of MRI data; applying an inverse Fourier transform to the motion-corrupted k-space data set and forming respective synthetic motion corrupted frames of MRI data in the image domain; and using the synthetic motion corrupted frames of MRI data to train a neural network that generates output frames of motion compensated MRI data.

Signal-to-noise ratio (SNR) is crucial for MR image analysis. High-SNR images enable better visualization of small structures, which not only facilitates the human interpretation, but also benefits subsequent processing techniques such as registration and segmentation[1B-4B]. The SNR is proportional to the square root of the number of average (NA). Increasing NA is a common method to boost the SNR, but it results in a longer scan time. On the other hand, low-field MRI has grown in popularity in recent years[5B-8B] due to advancements in hardware techniques and acquisition strategies. However, images acquired on low-field scanners inherently have low SNR due to the low Boltzmann polarization, which hinders its clinical application. Therefore, efficient and effective denoising is important for increasing MRI availability in the clinical setting.

The noise in a complex MR image is typically modeled as a complex additive white Gaussian noise (AWGN), with zero mean and equal variance for real and imaginary parts. Thus, the pixel intensity in the noise-corrupted magnitude image follows the Rician distribution[9B,10B] Numerous MRI denoising methods have been proposed based on decades of research. The non-local means (NLM) algorithm relies on the non-local similarity to remove Gaussian noise[11B-13B]. Wiest-Daesslé et al[15B] adapted the NLM algorithm for Rician noise and applied it to diffusion tensors MRI. Coupé et al[14B] reduced the time complexity of NLM through blockwise implementation and parallel computation. The block-matching and 3D filtering (BM3D) took advantage of the enhanced sparsity in the transform domain and used collaborative filtering to remove noise[16B-18B]. In recent years, deep learning-based approaches have shown great success in image denoising. The convolutional neural network (CNN) learns to restore the clean image by training it with a large number of noise-corrupted and ground-truth image pairs. Zhang et al[19B] combined residual learning and batch normalization in their DnCNN model for Gaussian denoising with unknown noise level (i.e., blind denoising). Later, Zhang et al[20B] demonstrated that incorporating the noise level information into the network (i.e., non-blind denoising) increased its generalizability. Manjón et al[21B] proposed a two-stage method that combines blind CNN denoising with the NLM algorithm. Li et al[22B] used a progressive learning strategy, cascading two sub-networks for crude and refinement noise estimation, respectively. Tian et al[23B] developed an MRI denoising method based on the conditional generative adversarial network (GAN). Koonjoo et al[24B] presented an end-to-end DL-based noise-robust reconstruction method for low-field MRI data.

However, the vast majority of existing MRI denoising methods do not fully exploit the complex-valued feature of MRI data. The input and output of conventional model-based approaches, such as NLM and BM3D, are both magnitude images, and phase information is ignored. CNN-based approaches typically treat the real and imaginary parts as two separate real-valued channels, similar to the RGB channels of a color image, which may limit the network's ability to extract features from complex-valued data. Recently, complex-valued CNNs have received increased attention. Complex-valued CNNs have several advantages over real-valued CNNs, including easier optimization, faster learning, and richer representational capacity[25B-28B]. Wang et al[29B] used the residual learning strategy to accelerate the convergence of their complex-valued CNN. El-Rewaidy et al[30B] applied a complex-valued CNN to reconstruct highly under-sampled cardiac MRI data. Cole et al[31B] evaluated the performance of complex-valued CNNs on phase-related MRI applications by systematically analyzing the impact of different model design choices. All of these works concentrated on the MRI reconstruction task, and to the best of our knowledge, no previous work attempted to use complex-valued CNN in the MRI denoising task.

Therefore, this paper designed and implemented non-blind ℂDnCNN, a complex-valued CNN for non-blind MRI denoising. The noise level map was estimated from the noise-corrupted image and fed into the network. Complex-valued building blocks were used throughout the network. This disclosure trained the network on simulated data and tested it on both simulated and in vivo data. This disclosure compared our method to several other denoising algorithms, both quantitatively and qualitatively. In the comparison, both magnitude and phase performance were evaluated. This disclosure also investigated the role of noise level map in dealing with parallel imaging noise that varies spatially.

Methods

Training Datasets

For supervised neural network training, ground truth images are required. Assume a noise-free image m(x), this disclosure generated the noise-corrupted image m'(x) by applying random, complex AWGN with zero mean and variance $\sigma^2$ to m(x):

$$m'(x) = m(x) + n_r(x; \sigma^2) + j \cdot n_i(x; \sigma^2)$$

However, ideal noise-free images do not exist. The training and validation datasets used in this work was built from the fastMRI brain dataset (https://fastmri.med.nyu.edu/)[32B,33B]. The raw fastMRI dataset contains nearly 7000 fully sampled multi-coil brain MRIs obtained on 1.5T or 3T scanners, comprising axial T1-weighted, post-contrast T1-weighted, T2-weighted and FLAIR images. Detailed descriptions can be found on the project website. This disclosure randomly selected 2000 T2-weighted imaging volumes for training the model and selecting model hyper-parameters. Single-coil data was reconstructed from multi-coil data through the use of an adaptive combine method[34B], in which the complex-valued coil sensitivities were estimated from a local matched filter. The adaptive combine method achieved the near optimal SNR while retaining the phase information. The reconstructed images were then center cropped to have matrix size 320×320. During the noise simulation, each image was normalized to have its magnitude between 0 to 1 and its phase unchanged. The noise standard deviation σ was sampled from a uniform distribution between 0.04 to 0.08.

Network Architecture

Figure 13:
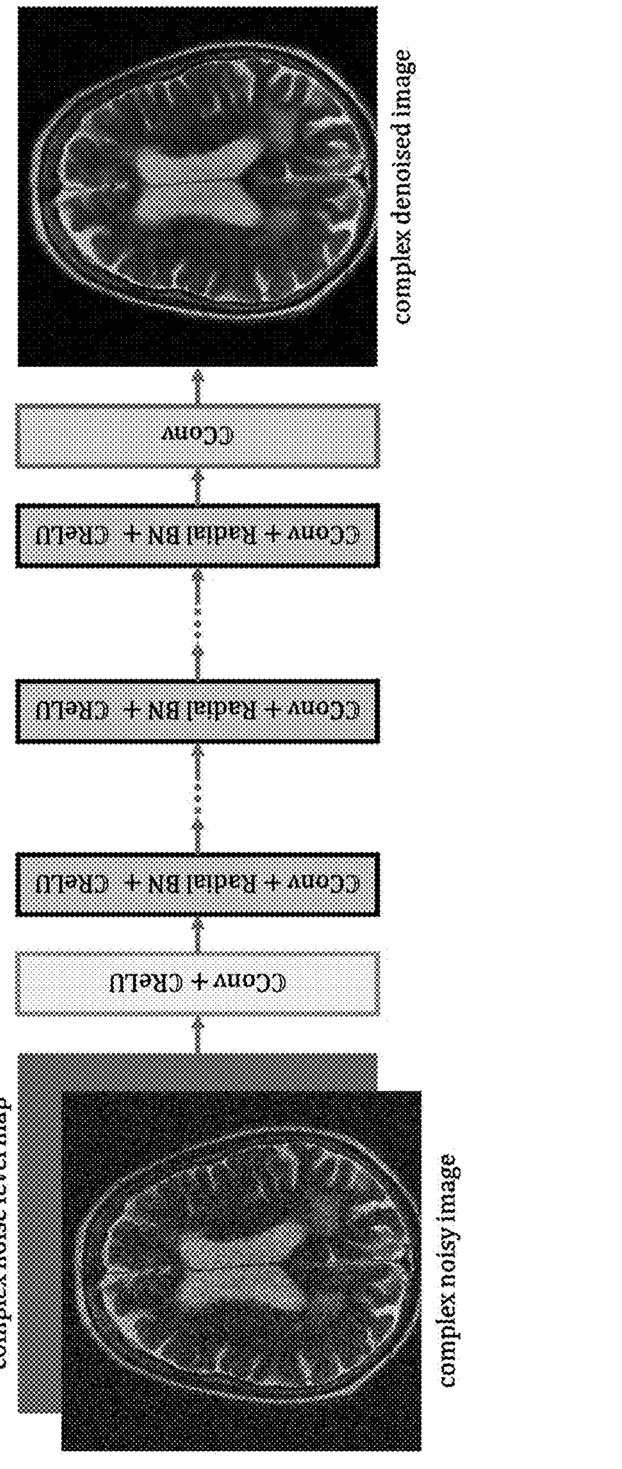
FIG. 13 shows an architecture of the non-blind ℂDnCNN for MRI denoising. The input is the complex-valued noisy image concatenated with the complex-valued noise level map, and the output is the complex-valued denoised image. The network consists of twelve 3×3 ℂConv. Each ℂConv is followed by a radial BN and a ℂReLU except for the first and last.

A DnCNN[19B] was used as our backbone network structure. The original DnCNN model was proposed for blind Gaussian denoising on natural images and achieved the state-of-the-art performance. The network was designed to use complex-valued operations rather than splitting the real and imaginary components into two separate channels. FIG. 13 shows the proposed non-blind ℂDnCNN for MRI denoising. The input to the network is a 2D complex-value MR image concatenated with a tunable complex-valued noise level map. The non-blind ℂDnCNN consists of a series of complex-valued convolution blocks. Three types of operations were adopted in each block: complex-valued convolution (ℂConv), radial batch normalization (BN), and complex-valued rectified linear unit (ℂReLU). The ℂConv operation between the input d=a+j·b and filter w=x+j·y can be accomplished by four real-valued convolutions[28B]:

$$w \circledast d = (x \circledast a - y \circledast b) + j \cdot (y \circledast a + x \circledast b)$$

where ⊛ represents the convolution operation. Batch normalization is an important operation to expedite training and stabilize model performance[35B]. This disclosure adopted the radial BN, which maintains the phase information while scaling the magnitude[30B]:

$$m_{BN} = \left(\frac{m - \mu_m}{\sqrt{\sigma_m^2}}\right)\gamma + \beta + \tau$$

$$d_{BN} = m_{BN} e^{j\theta}$$

where $d = me^{j\theta}$ is the input expressed in its polar form, $\mu_m$ and $$\sigma_m^2$$

are the mean and variance of m, β and γ are trainable parameters, and τ is a constant to ensure the normalized $m_{BN}$ to be positive (empirically set to 1). The ℂReLU function separately activates the real and imaginary components of the input[28B]:

$$\mathbb{C}ReLU(d) = ReLU(a) + j \cdot ReLU(b)$$

The first block of the network is composed of a ℂConv and a ℂReLU, the middle blocks are composed of a ℂConv, a radial BN and a ℂReLU, and the last block is composed of a ℂConv to produce the output image. All of the ℂConv kernels have a size of 3×3 and a depth of 64 in order to balance the denoising performance and computational efficiency.

The network was implemented in the open-source machine learning library PyTorch[36] and trained with an L1 loss:

$$\mathcal{L}(\Theta) = \frac{1}{N}\sum_{i=1}^{N} |\mathbb{C}DnCNN(m'(x_i); \Theta) - m(x_i)|$$

where N is the total number of training pairs, and Θ represents trainable parameters in the network. The optimization was carried out by an Adam optimizer[37B] with an initial learning rate of 0.0001 and momentum parameters $\beta_1=0.9$ and $\beta_2=0.999$. The training batch size was fixed to 32. Random flips and random patch cropping was employed as training augmentation to reduce the possibility of overfitting and improve the model robustness.

Noise Level Map

To cope with images at different noise levels, specifying the noise standard deviation σ is required for most conventional model-based denoising techniques, such as NLM and BM3D. In practice, however, the noise standard deviation is unknown in most circumstances, and a wavelet-based approach[38B] is commonly used to obtain an estimated standard deviation $\hat{\sigma}$. Specifically, this disclosure used the estimate_sigma function from the scikit-image Python package[39B] in this work. On the other hand, by running this parameter, this disclosure can regulate the trade-off between noise reduction and blurring effect. With a larger $\hat{\sigma}$, the noise is removed but details are smoothed out; with a smaller $\hat{\sigma}$, both the noise and details are preserved.

For CNN-based natural image denoising, providing the network with $\hat{\sigma}$ can also improve the denoising performance at different noise levels[20B]. In order to incorporate this information into our ℂDnCNN for MRI denoising, this disclosure built a complex-valued noise level map with its size matching the input MR image and concatenated it with the input image. All pixels in the noise level map were set to $\hat{\sigma}_{avg}+j\cdot\hat{\sigma}_{avg}$, where $\hat{\sigma}_{avg}$ was the average of $\hat{\sigma}$'s estimated from the real and imaginary parts of the input image:

$$\hat{\sigma}_{avg} = \frac{\text{estimate\_sigma}(\text{Real}\{m'(x)\}) + \text{estimate\_sigma}(\text{Imag}\{m'(x)\})}{2}$$

Furthermore, since ℂDnCNN is fully convolutional, it inherently provides the flexibility to deal with spatially non-uniform noise. For parallel MRI, such as sensitivity encoding (SENSE)[40B] and generalized autocalibrating partially parallel acquisitions (GRAPPA)[41B], the noise is amplified by the geometry factor (g-factor). The g-factor is determined by the coil geometry and changes across the image. By weighting the uniform noise level map with a g-factor map, the network is capable of handling the spatially varying noise.

Evaluation

In this disclosure, the embodiments first created a simulated testing dataset from the fastMRI brain dataset to evaluate the performance of the proposed denoising method. To avoid overlap between the training and testing subsets, another 200 T2-weighted imaging volumes were chosen at random. Simulated complex AWGN with zero mean and standard deviation between 0 to 0.1 was added to the testing data. This disclosure compared our method to other denoising algorithms including NLM, BM3D (https://webpages-.tuni.fi/foi/GCF-BM3D/), real-valued DnCNN, ℂDnCNN without noise level map (blind). The NLM a BM3D algorithms operated on the magnitude images, while the ℂDnCNN and non-blind ℂDnCNN operated on the complex-valued images, and the real-valued DnCNN treated the real and imaginary components as two separate channels. For quantitative assessment, the normalized root-mean-square error (NRMSE), peak signal-to-noise ratio (PSNR), and structural similarity index (SSIM)[42B] of the magnitude images were calculated. In the following definitions, x denotes the output image with size m×n, y denotes the reference image with the same size, and |•| means taking the magnitude.

$$NRMSE(|x|, |y|) = \sqrt{\frac{MSE(|x|, |y|)}{MSE(|x|, 0)}}$$

$$PSNR(|x|, |y|) = 20\log_{10}\left(\frac{\max(|x|)}{\sqrt{MSE(|x|, |y|)}}\right)$$

$$SSIM(|x|, |y|) = \frac{(2\mu_{|x|}\mu_{|y|} + c_1)(2\sigma_{|x||y|} + c_2)}{\left(\mu_{|x|}^2 + \mu_{|y|}^2 + c_1\right)\left(\sigma_{|x|}^2 + \sigma_{|y|}^2 + c_2\right)}$$

where $$MSE(|x|, |y|) = \frac{\sum_{i=0}^{m-1}\sum_{j=0}^{n-1}(|x_{ij}| - |y_{ij}|)^2}{mn}$$

is the mean-square error between |x| and |y|, $\mu_{|x|}$ and $\mu_{|y|}$ are the means of |x| and |y|, $$\sigma_{|x|}^2 \text{ and } \sigma_{|y|}^2$$

are the variances of |x| and |y|, $$\sigma_{|x||y|}^2$$

is the cross-variance of |x| and |y|, and $c_1$=0.01 and $c_2$=0.03 are regularization constants. Both |x| and |y| were normalized with respect to |y| before metric calculation. For three CNN-based methods generating complex-valued output images, the absolute difference (ABSD) of the phase images was also calculated to test whether the phase information was altered:

$$ABSD(\angle x, \angle y) = \frac{\sum_{i=0}^{m-1}\sum_{j=0}^{n-1}|\angle x_{ij} - \angle y_{ij}|}{mn}$$

where ∠• means taking the phase. For a fair comparison between different CNN-based methods, all CNNs had the same number of trainable parameters. Manual tunning was performed to determine the optimal combination of hyper-parameters for each model.

The role of the noise level map in dealing with spatially non-uniform parallel imaging noise was also explored. This disclosure first utilized the fully sampled multi-coil k-space data from the raw fastMRI dataset to generate the coil sensitivity map for g-factor calculation. Complex AWGN was then added to each coil. This disclosure assumes, for simplicity, that the standard deviation of Gaussian noise at each coil has the same value and there is no correlation across coils[43B]. The noise-corrupted k-space data was sub-sampled and reconstructed using SENSE. To address the spatially varying noise, the uniform noise level map was weighted by the g-factor map. In practice, the coil sensitivity map and g-factor map can be acquired during the preparation phase with no additional scan time cost.

To test the generalizability of non-blind ℂDnCNN, its performance on different contrasts and anatomies was also assessed. T1-weighted and FLAIR brain images and proton density (PD) weighted knee images from the fastMRI dataset were randomly selected to form a testing dataset out of the training distribution. Additionally, the network was applied to in vivo data collected from a 0.55 T low-field scanner. To evaluate the image quality without reference, the SNR for white matter (WM) and gray matter (GM) were computed based on manually defined regions of interest (ROIs):

$$SNR = 0.66 \times \frac{\mu_{ROI}}{\sigma_{air}}$$

where $\mu_{ROI}$ is the mean intensity of the ROI, $\sigma_{air}$ is the standard deviation of the air region, and 0.66 is the correction factor for the Rayleigh distribution of the noise in the magnitude image[44B].

Results

Figure 14:
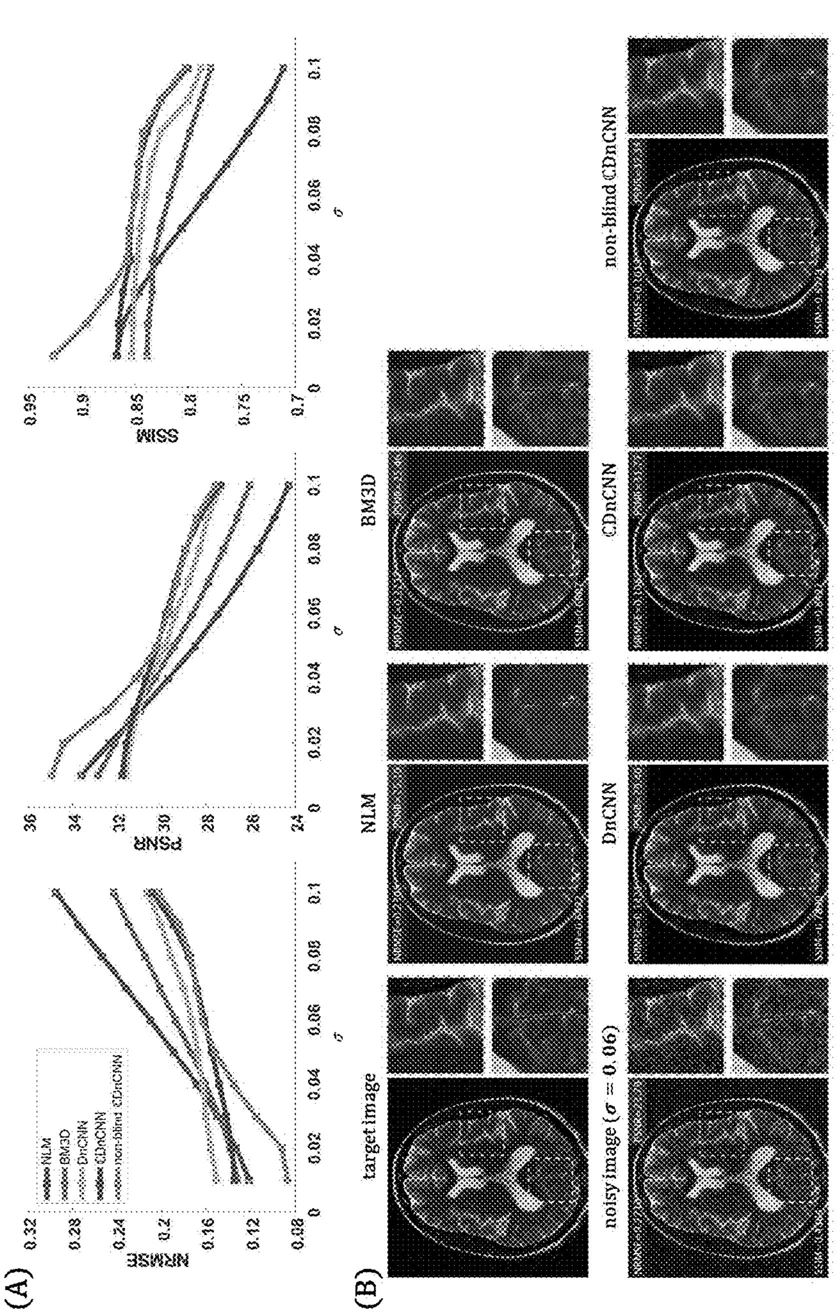
FIG. 14 shows (FIG. 14A) Performance of different denoising methods on the simulated testing dataset at different noise levels. The average NRMSE, PSNR, and SSIM were evaluated for each method.
Figure 15:
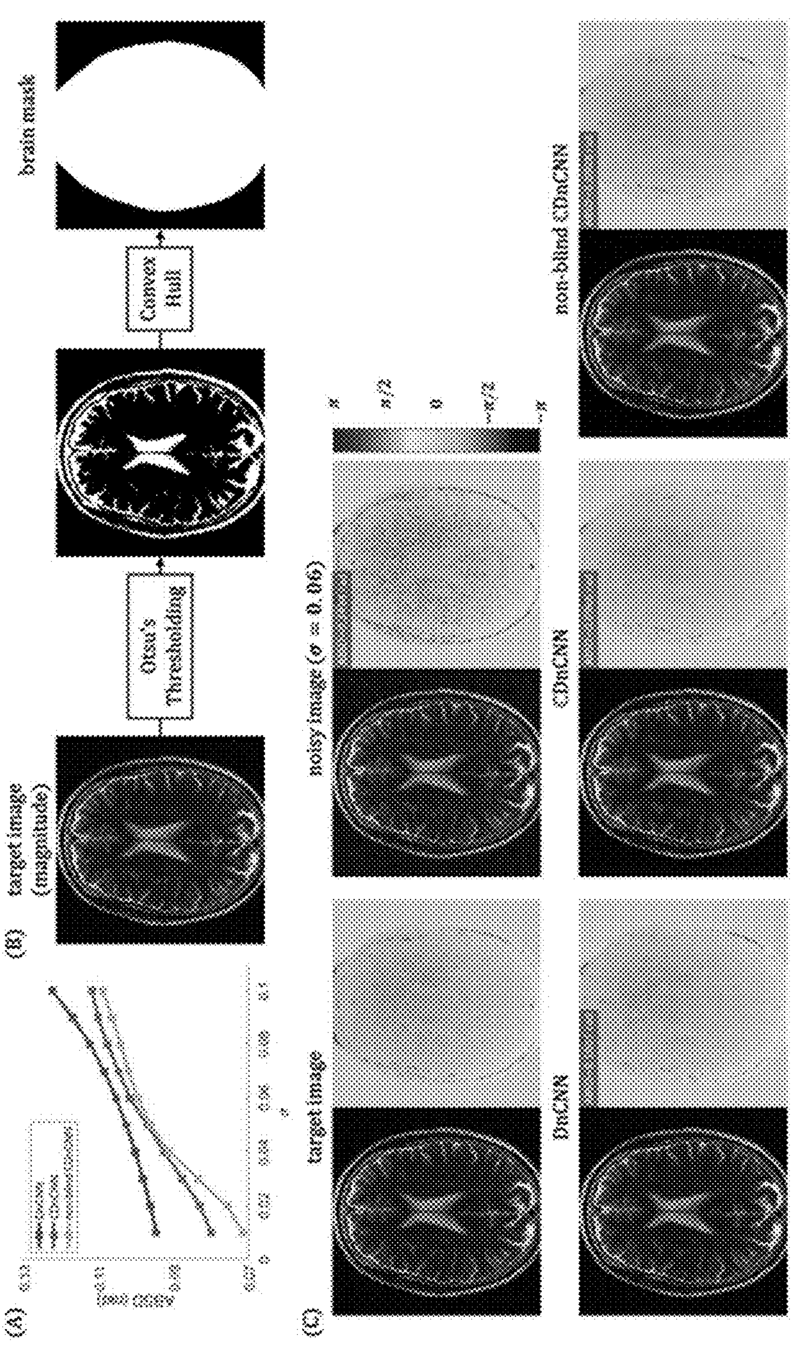
FIG. 15 shows (FIG. 15A) Phase difference of DnCNN, ℂDnCNN, and non-blind ℂDnCNN on the simulated testing dataset at different noise levels. The average phase ABSD was evaluated for each network.

FIG. 14A shows the performance of different denoising algorithms on the simulated noise-corrupted dataset at different noise levels. When the noise standard deviation σ was larger than 0.04, three CNN-based algorithms outperformed NLM and BM3D. Compared to real-valued DnCNN with two-channel input, the output of ℂDnCNN and non-blind ℂDnCNN showed superior NRMSE, PSNR and SSIM over the entire range of 0 to 0.1. When σ was in the training range of 0.04 to 0.08, ℂDnCNN and non-blind ℂDnCNN showed similar performance. When σ was out of the training range, non-blind ℂDnCNN showed better performance. Representative images are displayed in FIG. 14B. Compared to other methods, the output of non-blind ℂDnCNN showed reduced noise and less visual blurring. FIG. 15A shows the phase difference for CNN-based methods. To eliminate the impact of random phase in the background, a mask covering the brain region was generated from the reference magnitude image using Otsu's thresholding[45] and convex hull operation, as shown in FIG. 15B. Representative phase images are displayed in FIG. 15C. The phase of the output images did not deviate significantly from the reference phase. The non-blind ℂDnCNN outperformed others in terms of reserving the phase information.

Figure 16:
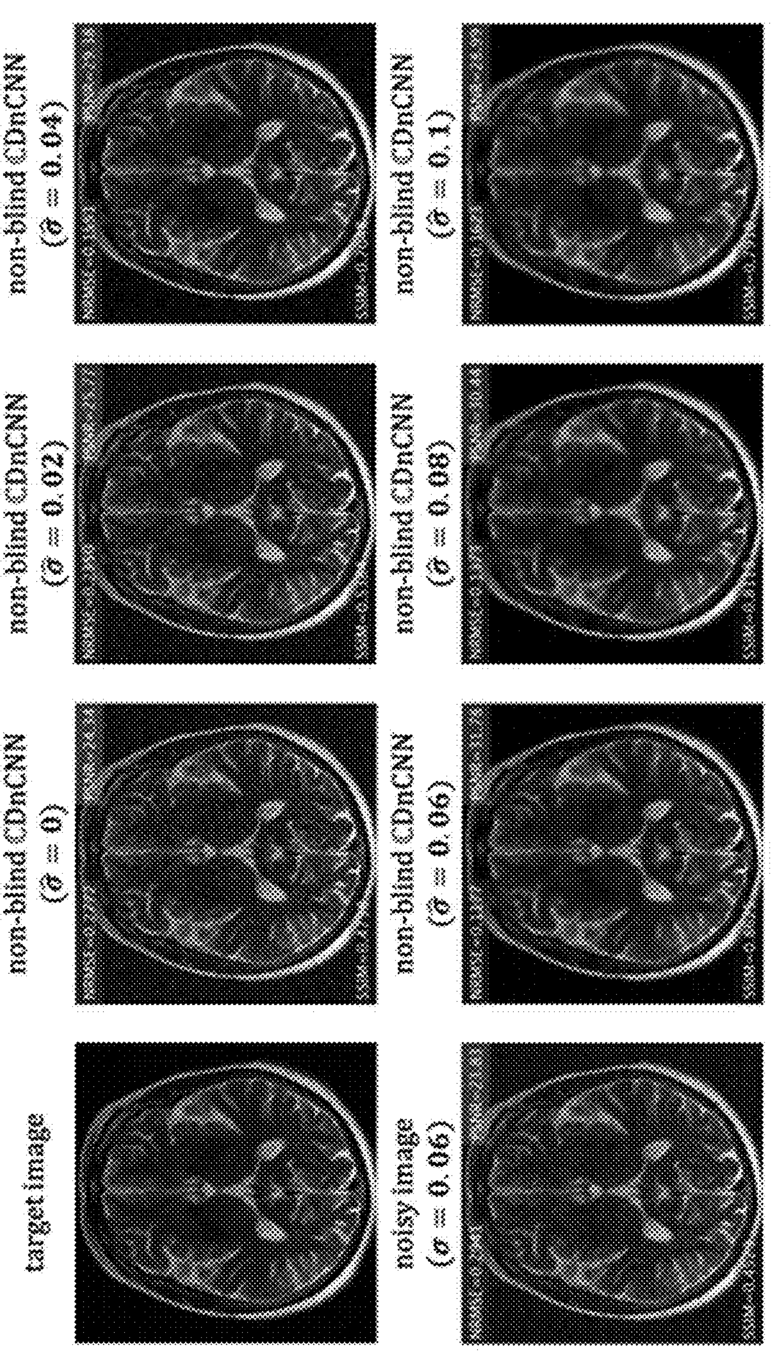
FIG. 16 shows Performance of non-blind \mathbb{C}DnCNN with different estimated noise standard deviations \hat{\sigma}. Top left is the ground truth image, and bottom left is the simulated noise-corrupted image with the actual noise standard deviation being 0.06. Right columns are the denoising results of non-blind \mathbb{C}DnCNN with \hat{\sigma} equal to 0, 0.02, 0.04, 0.06, 0.08 and 0.1, respectively.
Figure 17:
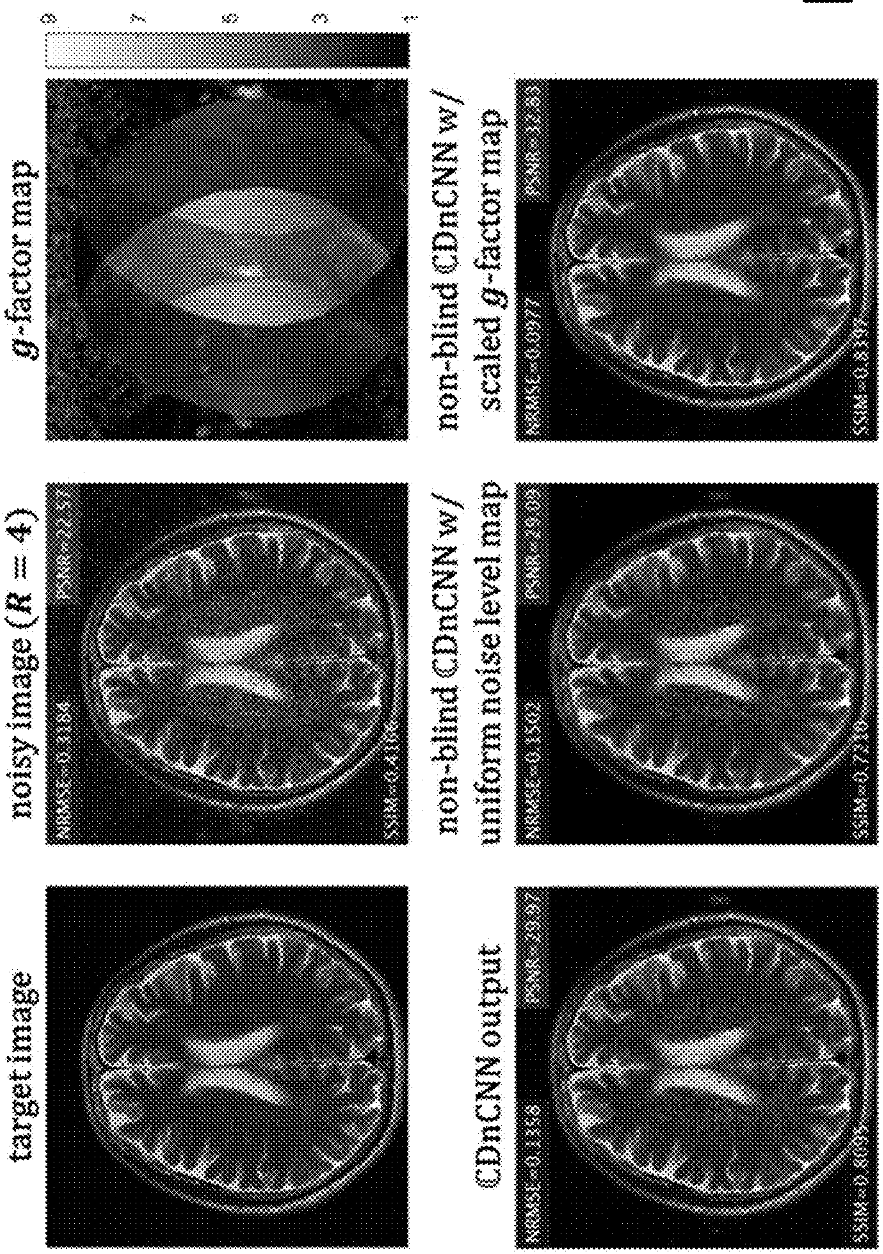
FIG. 17 shows Example of non-blind \mathbb{C} DnCNN on spatially varying parallel imaging artifacts. Top left is the ground truth image. Top center is the simulated noise-corrupted image reconstructed by SENSE with a sub-sampling ratio of 4. Top right is the g-factor map from the SENSE reconstruction. Bottom left is the output of \mathbb{C}DnCNN without noise level map. Bottom center is the output of non-blind \mathbb{C}DnCNN with a uniform noise level map. Bottom right is the output of non-blind \mathbb{C}DnCNN with the scaled g-factor map as the noise level map.

FIG. 16 gives an example showing the role of the noise level map in balancing noise reduction and blurring effect. When the estimated noise standard deviation $\hat{\sigma}$ was set to a value lower than the actual σ, noise still remained in the output image. As $\hat{\sigma}$ increased, the output image became blurred, and image details were smoothed out. When $\hat{\sigma}$ matched the actual σ, the output image showed the lowest NRMSE and highest PSNR and SSIM. FIG. 17 gives an example showing the network performance on spatially varying parallel imaging artifacts. The noise in the SENSE reconstructed image was amplified by the g-factor due to the coil geometry. With scaled g-factor map as the noise level map, non-blind ℂDnCNN successfully reduced the noise and showed the greatest image quality, whereas other methods failed at the center regions with large g-factor.

Figure 18:
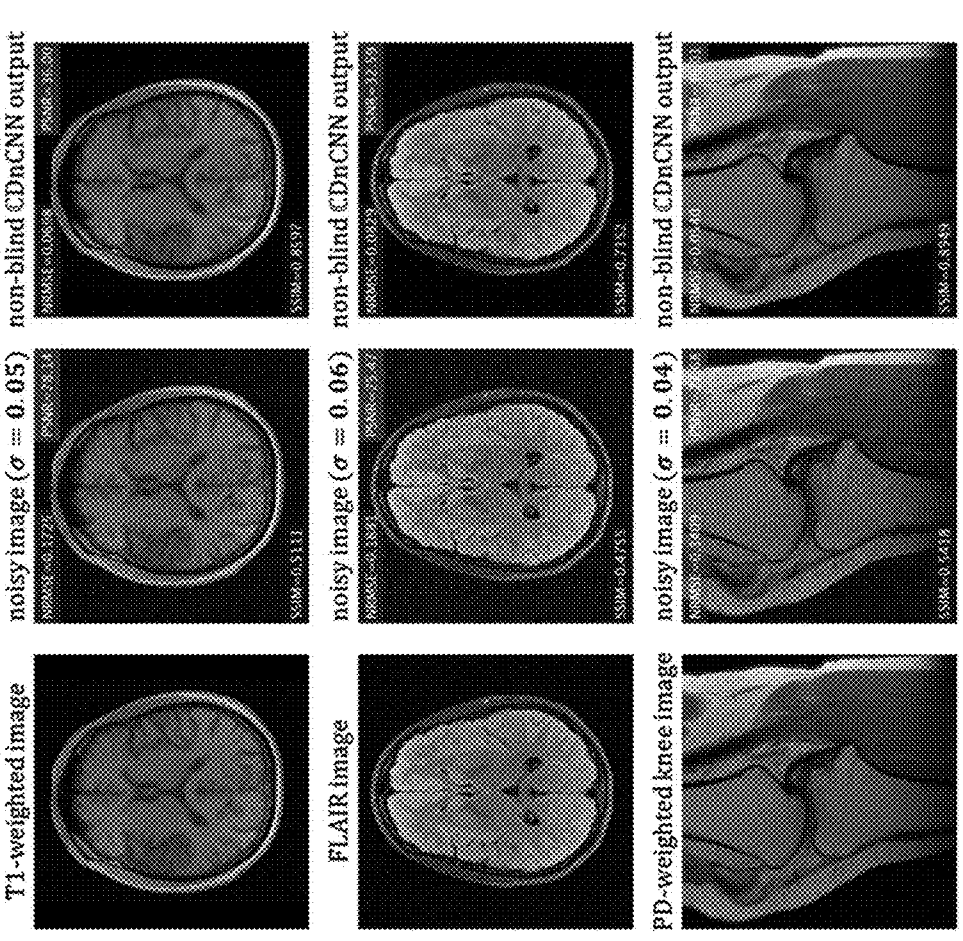
FIG. 18 shows Performance of non-blind \mathbb{C} DnCNN on modalities or anatomies out of the training distribution. The top row is a T1-weighted brain image, the middle row is a FLAIR brain image, and the bottom row is a PD-weighted knee image. From left to right, each column is the ground truth image, the simulated noise-corrupted image, and the output of non-blind \mathbb{C}DnCNN, respectively.
Figure 19:
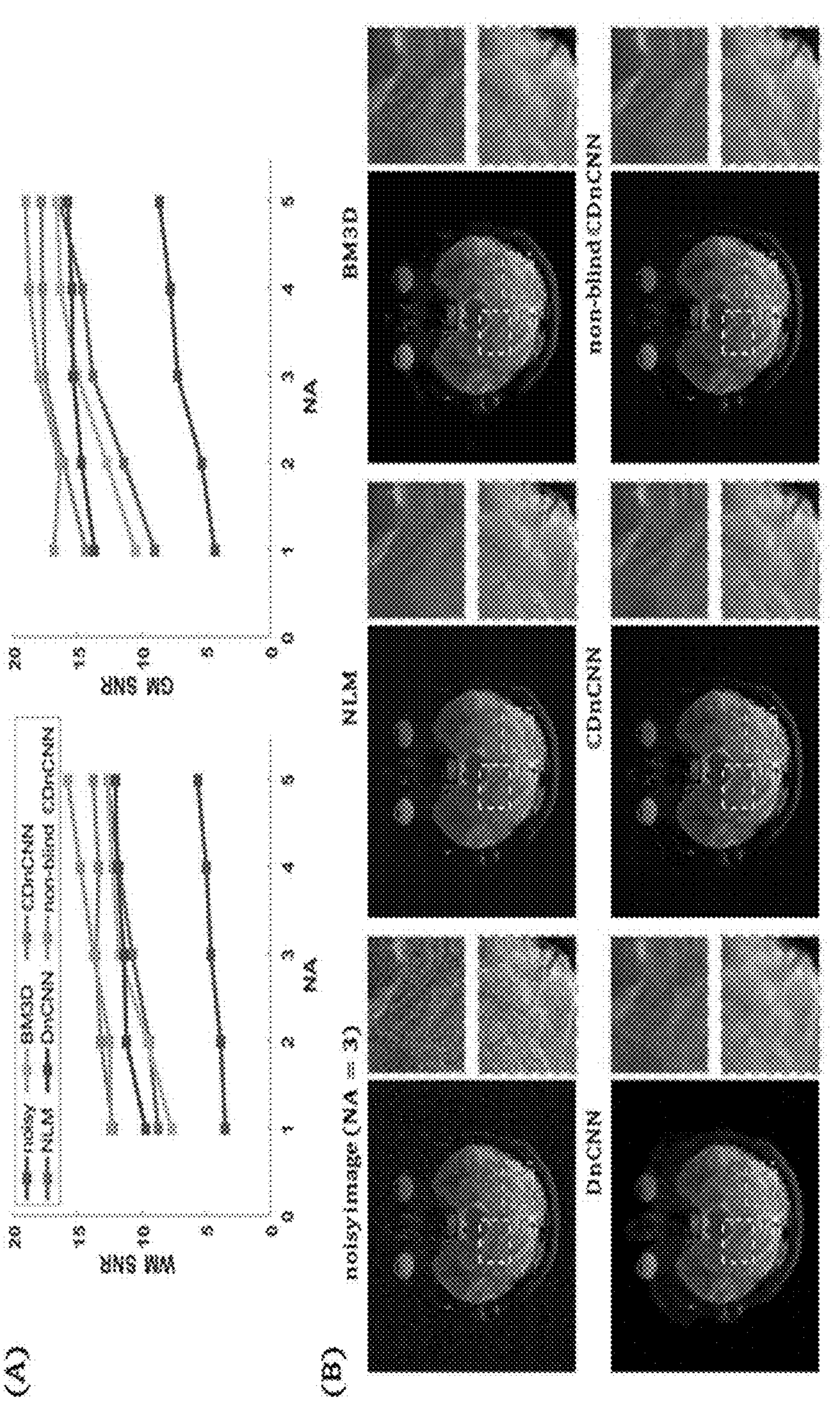
FIG. 19 shows (FIG. 19A) Performance of different denoising methods on in vivo images collected from a low-field scanner with different NAs. The average WM and GM MSRs were evaluated for each method.
Figure 20:
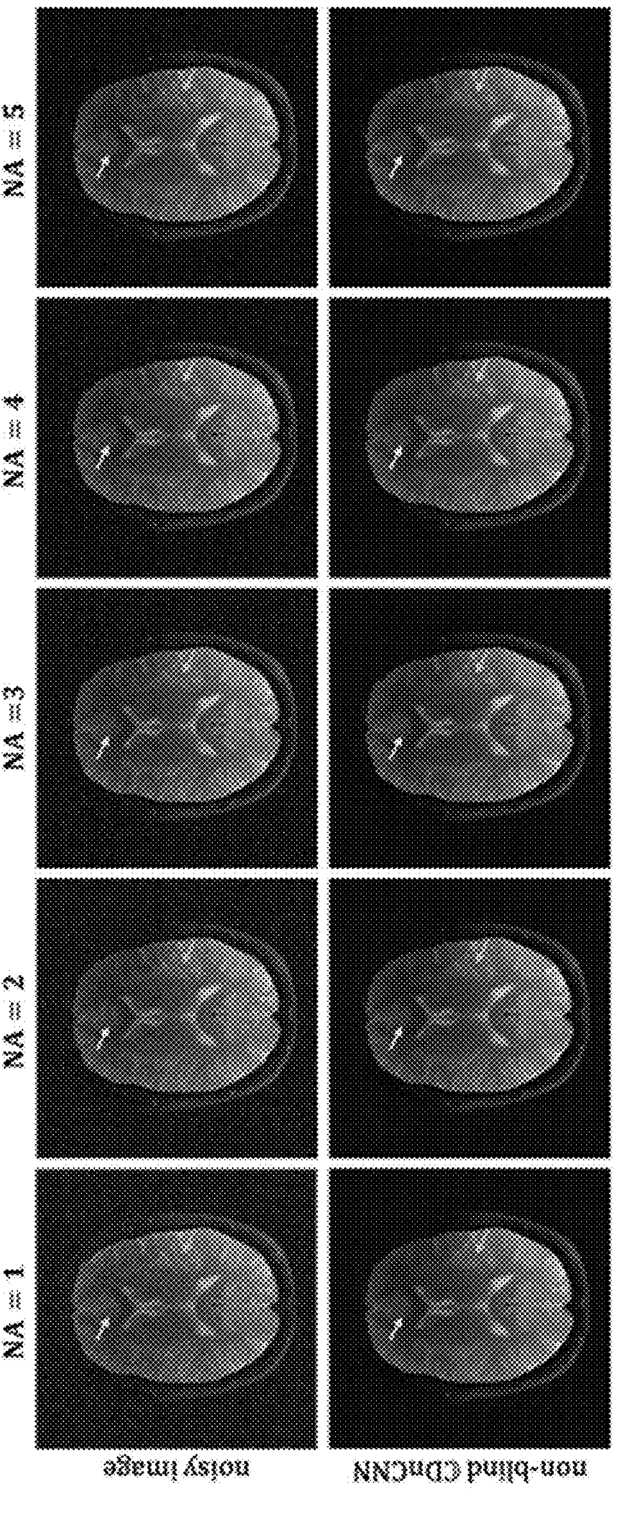
FIG. 20 shows Performance of non-blind \mathbb{C} DnCNN at different noise levels. Top row is the original noisy image, and each column was acquired with NA of 1, 2, 3, 4, and 5, from left to right. Bottom row is the output of \mathbb{C}DnCNN. The small structures (yellow and cyan arrows) became sharp and visible as NA increased.

FIG. 18 shows the generalizability of non-blind ℂDnCNN on data out of the training distribution. The testing images had contrasts and anatomies that were different from the training dataset. The output images were less noisy and showed superior metrics, demonstrating that the model was able to generalize under these circumstances and did not overfit to the training data. FIG. 19A shows the performance of different denoising methods on in vivo data collected from a low-field scanner. It can be observed that all methods reduced the noise and increased the SNRs for WM and GM. The blind ℂDnCNN and non-blind ℂDnCNN showed superior performance compared to other methods. When NA was under 3, non-blind ℂDnCNN achieved approximately equivalent performance compared to blind ℂDnCNN. However, when NA was larger than 3, the non-blind ℂDnCNN showed superior performance. Representative images are displayed in FIG. 19B. The output of ℂDnCNN and non-blind ℂDnCNN showed sharper structures and less noise. FIG. 20 shows the output of non-blind ℂDnCNN with different NAs. The network showed its generalizability as it was able to enhance the overall image quality at different noise levels. When NA increased, small brain structures became more observable in the output image.

The total training time for non-blind ℂDnCNN on a system with a NVIDIA Titan Xp GPU, an Intel Xeon 3.3 GHz CPU, and 128 GB RAM was roughly 42 hours. This disclosure measured the computational cost of different algorithms on the same system. Table 1 summarizes the inference time and memory required for denoising one slice with size 320×320. Note that the time for estimating the noise standard deviation was also counted. The non-blind ℂDnCNN was able to process one slice in less than 1.5 seconds on CPU. The inference time could be significantly shortened with GPU acceleration.

DISCUSSION

In this study, this disclosure presented non-blind ℂDnCNN, a network for MRI denoising that leverages complex-valued building blocks and noise level information to improve denoising performance in various settings. The proposed method achieved superior performance on both simulated and in vivo testing data compared to other algorithms.

The utilization of complex-valued operations allows the network to better exploit the complex-valued MRI data and preserve the phase information. For NLM and BM3D, the denoising is directly performed on the magnitude image. The phase information is lost and cannot be recovered after denoising. Thus, the phase performance for these approaches was not examined. For real-valued CNNs, the input image is split into real and imaginary channels, and real-valued operations are then applied on these channels. The output image is obtained by combining the two separate output channels, and the reconstructed phase may be changed. For complex-valued CNNs, the input/output, learned convolutional kernels, and latent features are all in complex-valued representations, enabling the network to make use of the valuable information contained in the phase map. The superior metrics achieved by complex-valued CNNs demonstrate that integrating the phase information is beneficial for the denoising process.

The DnCNN network architecture is used in this work, since the original DnCNN model attained remarkable performance on Gaussian denoising. Recently, the U-Net architecture[46B] is of growing interest in solving problems like medical image segmentation and reconstruction[30B,31B,47B-49B]. The downscaling/upscaling blocks in the U-Net-based model effectively increase the network receptive field and allow the network to utilize both global and regional features.

One major concern about CNN-based denoising techniques is the blurring effect introduced by the network. To mitigate this drawback, this paper chose the L1 loss instead of L2 loss, as revealed by previous studies that using L2 loss is prone to produce over-smoothed restored images[50-52]. Besides, incorporating the noise level into the network provides the flexibility to control the balance between noise suppression and detail retention. In practice, if the blurring is prominent in the denoised image, this disclosure can decrease $\hat{\sigma}$ to obtain an output with less blurring. The spatially non-uniform noise level map also allows the network to remove the spatially dependent parallel imaging noise. This advantage improves its clinical feasibility since parallel imaging is frequently used to accelerate the scan. In our experiment, this disclosure used a wavelet-based method to estimate the noise level for real and imaginary parts separately, and adopted a naïve averaging to get the final estimation of $\hat{\sigma}$. To address parallel imaging noise, this disclosure weighted the uniform noise level map with the g-factor map. There exist numerous MRI noise estimation schemes relying on wavelet domain analysis, local mutual information, or median absolute deviation estimator[53B-55B]. This disclosure shows that applying these techniques will give a more accurate noise level map and further improve the network performance. Training the non-blind ℂDnCNN with GAN[56B,57B] is an alternative way to reduce blurring in the network output. However, the GAN scheme for complex-valued networks remains to be investigated.

Overfitting is another issue for supervised learning models. Due to the limited size of the training set, the model might fit too closely to the training data. In such situation, the network begins to memorize irrelevant information, e.g., the brain anatomy or image contrast, instead of finding a general strategy for denoising. This is a critical problem for medical image processing since the spurious structures or subtle artifacts created by the network can severely affect the diagnosis. To alleviate overfitting, image augmentations were employed to increase the diversity of the training set. The validation loss was also monitored after each epoch during the training stage. Additional tests on data out of the training distribution proved that the method is generalizable. The network also showed promising results on in vivo data acquired on a low-field scanner, demonstrating its ability to boost the SNR of low-field MR images and its potential to reduce the acquisition time of low-filed MRI. However, more studies are needed to validate the network robustness on images of different body regions with different scan parameters.

NON-LIMITING EXAMPLE EMBODIMENTS

A computer-implemented method of denoising a magnetic resonance (MR) image includes acquiring complex magnetic resonance (MR) image data of an area of interest of a subject, wherein the image data includes complex noisy input images of multi-coil MR image data, and wherein the complex noisy input images comprise noise data and noise free image data. For each of the noisy input images, the method includes running an iteration of a complex convolution to a converging sequence with a complex de-noising convolutional neural network (C-DnCNN). In each iteration, the method includes updating parameter settings used in calculating a series of image feature sets with the C-DnCNN, and the image feature sets predict a respective residual image from the complex noisy input images. The complex noisy input images also include a corresponding latent clean image. The method includes removing a final latent clean image from the complex noisy input images.

The method may include calculating complex single coil data from the complex noisy input images of multi-coil MR image data.

The method may include instances in which the complex convolutions are applied directly to the complex single coil data representing the complex noisy images.

The method may include instances in which the complex convolutions are of the form W*d=(A*x−B*y)+i (B*x+A*y) where W=A+iB is a complex filter and d=x+iy represents the complex single coil data.

The method may include applying radial batch normalization to each iteration of the complex convolution.

The method may include within the radial batch normalization, updating the parameters comprising a mean and a variance of the complex single coil data.

The method may include applying the radial batch normalization according to a complex data expression:

$$r_{BN} = \left(\frac{(r-\mu_r)}{\sqrt{\sigma_r^2}}\right)\gamma + \beta + \tau,\ d_{BN} = r_{BN}e^{i\theta}$$

where $\mu_r$ and $$\sigma_r^2$$

are the mean and variance of r, β and γ are trainable parameters, and τ is constant to ensure the normalized $r_{BN}$ to be positive, and d=x+iy representing the complex single coil data.

The method may include applying a complex rectified linear unit C-ReLu at each iteration of the complex convolution.

The method may include separately activating a real part and an imaginary part of the C-ReLu at each iteration with an expression of the ReLu comprising:

$$C\text{-}ReLU(d) = ReLU(x) + iReLU(y)$$

wherein d=x+iy represents the complex single coil data.

The method may include training the complex de-noising convolutional neural network (C-DnCNN) with image pairs corresponding to each iteration by forming an image pairing of an original frame of noise free MRI data and a respectively updated frame of noise corrupted MRI data; and applying the image pairing to the complex de-noising convolutional neural network (C-DnCNN) to train the neural network iteratively.

The method may include instances in which the noise corrupted MRI data comprises random complex Gaussian noise.

The method may include the complex de-noising convolutional neural network (C-DnCNN) utilizing random patch cropping as a training augmentation.

The method may include running an iteration of the complex convolution comprises running the complex convolution on the real part of the complex single coil data and the imaginary part of the complex single coil data in a single calculation.

The method may include instances in which running an iteration of the complex convolution comprises running the complex convolution on the real part of the complex single coil data and the imaginary part of the complex single coil data simultaneously.

In another non-limiting embodiment for denoising a magnetic resonance (MR) image, a system may include one or more processors and a memory device coupled to the one or more processors and storing instructions which, when executed by the one or more processors, cause the system to perform functions that include acquiring complex magnetic resonance (MR) image data of an area of interest of a subject, wherein the image data includes complex noisy input images of multi-coil MR image data, and wherein the complex noisy input images comprise noise data and noise free image data. For each of the noisy input images, the system may include using the instructions for running an iteration of a complex convolution to a converging sequence with a complex de-noising convolutional neural network (C-DnCNN). In each iteration, the system updates parameter settings used in calculating a series of image feature sets with the C-DnCNN, and the image feature sets predict a respective residual image from the complex noisy input images, relative to a corresponding latent clean image. The system may be configured to remove a final latent clean image from the noisy input images.

In another embodiment, a non-transitory computer-readable medium stores instructions thereon which, when executed by one or more processors, cause a computer to perform functions for denoising a magnetic resonance (MR) image that include acquiring complex magnetic resonance (MR) image data of an area of interest of a subject, wherein the image data includes complex noisy input images of multi-coil MR image data, and wherein the complex noisy input images include noise data and noise free image data. For each of the noisy input images, the instructions are configured for running an iteration of a complex convolution to a converging sequence with a complex de-noising convolutional neural network (C-DnCNN). In each iteration, the instructions update parameter settings used in calculating a series of image feature sets with the C-DnCNN, and the image feature sets predict a respective residual image from the complex noisy input images, relative to a corresponding latent clean image. The instructions are further configured for removing a final latent clean image from the noisy input images.

CONCLUSION

The specific configurations, choice of materials and the size and shape of various elements can be varied according to particular design specifications or constraints requiring a system or method constructed according to the principles of the present disclosure. Such changes are intended to be embraced within the scope of the present disclosure. The presently disclosed embodiments, therefore, are considered in all respects to be illustrative and not restrictive. The patentable scope of certain embodiments of the present disclosure is indicated by the appended claims, rather than the foregoing description.

LIST OF REFERENCES

[1] Buades, A., Coll, B., Morel, J.-M.: Non-Local Means Denoising. Image Processing On Line. 1, (2011).

[2] Dabov, K., Foi, A., Katkovnik, V., Egiazarian, K.: Image denoising with block-matching and 3D filtering. Image Processing: Algorithms and Systems, Neural Networks, and Machine Learning. (2006).

[3] Zhang, K., Zuo, W., Chen, Y., Meng, D., Zhang, L.: Beyond a Gaussian Denoiser: Residual Learning of Deep CNN for Image Denoising. IEEE Transactions on Image Processing. 26, 3142-3155 (2017).

[4] Ulyanov, D., Vedaldi, A., Lempitsky, V.: Deep image prior. arXiv Preprints. (2017).

[5] Cocosco, C. A., Kollokian, V., Kwan, R. K., Evans, A. C.: BrainWeb: Online Interface to a 3D MRI Simulated Brain Database. NeuroImage. 5, (1997).

[6] Patel, M. R., Klufas, R. A., Alberico, R. A., Edelman, R. R.: Half-fourier acquisition single-shot turbo spin-echo (HASTE) MR: comparison with fast spin-echo MR in diseases of the brain. American Journal of Neuroradiology. 18, 1635-1640 (1997).

[7] Griswold, M. A., Jakob, P. M., Heidemann, R. M., Nittka, M., Jellus, V., Wang, J., Kiefer, B.: Generalized autocalibrating partially parallel acquisitions (GRAPPA). Magnetic Resonance in Medicine. 47, 1202-1210 (2002).

[8] Qigek, Ozgun et al., 3D U-Net: Learning Dense Volumetric Segmentation from Sparse Annotation published in MICCAI 2016.

[9] Silva, Thalles, An intuitive introduction to Generative Adversarial Networks (GANs; https://www.freecodecamp.org/news/an-intuitive-introduction-to-generative-adversarial-networks-gans-7a2264a81394/ (accessed on Apr. 22, 2020).

FIRST LIST OF SUPPLEMENTAL REFERENCES

[1A] Havsteen I, Ohlhues A, Madsen K H, et al. Are Movement Artifacts in Magnetic Resonance Imaging a Real Problem?—A Narrative Review. Front Neurol. 2017; 8:232. doi: 10.3389/fneur.2017.00232. PMCID: PMC5447676.

[2A] Edwards A D, Arthurs O J. Paediatric MRI under sedation: is it necessary? What is the evidence for the alternatives? Pediatr Radiol. 2011; 41(11):1353-1364. doi: 10.1007/s00247-011-2147-7.

[3A] McGibney G, Smith M R, Nichols S T, Crawley A. Quantitative evaluation of several partial Fourier reconstruction algorithms used in MRI. Magn Reson Med. 1993; 30(1):51-59.

[4A] Pruessmann K P, Weiger M, Scheidegger M B, Boesiger P. SENSE: sensitivity encoding for fast MRI. Magn Reson Med. 1999; 42(5):952-962.

[5A] Griswold M A, Jakob P M, Heidemann R M, et al. Generalized autocalibrating partially parallel acquisitions (GRAPPA). Magn Reson Med. 2002; 47(6):1202-1210.

[6A] Lustig M, Pauly J M. SPIRiT: Iterative self-consistent parallel imaging reconstruction from arbitrary k-space. Magn Reson Med. 2010; 64(2):451-471. doi: 10.1002/mrm.22428. PMCID: PMC2925465.

[7A] Lustig M, Donoho D, Pauly J M. Sparse MRI: The application of compressed sensing for rapid MR imaging. Magn Reson Med. 2007; 58(6):1182-1195.

[8A] Glover G H, Li T Q, Ress D. Image-based method for retrospective correction of physiological motion effects in fMRI: RETROICOR. Magn Reson Med. 2000; 44(1): 162-167.

[9A] Maclaren J, Herbst M, Speck O, Zaitsev M. Prospective motion correction in brain imaging: a review. Magn Reson Med. 2013; 69(3):621-636. doi: 10.1002/mrm.24314.

[10A] Buades A, Coll B, Morel J. A non-local algorithm for image denoising. In Proc. 2005 IEEE Computer Society Conference on Computer Vision and Pattern Recognition (CVPR'05), San Diego, CA, USA, 2005, pp. 60-65, vol. 2. doi: 10.1109/CVPR.2005.38.

[11A] Coupe P, Yger P, Prima S, Hellier P, Kervrann C, Barillot C. An optimized blockwise nonlocal means denoising filter for 3-D magnetic resonance imaging. IEEE Trans Med Imaging. 2008; 27(4):425-441. doi: 10.1109/TMI.2007.906087.

[12A] Chang L, ChaoBang G, Xi Y. A MRI denoising method based on 3D nonlocal means and multidimensional PCA. Comput Math Methods Med. 2015; 232389. doi: 10.1155/2015/232389.

[13A] Bhujle H V, Chaudhuri S. Laplacian based non-local means denoising of MR images with rician noise. Magn Reson Imaging. 2013; 31(9):1599-1610. doi: 10.1016/j.mri.2013.07.001.

[14A] Zhang X, Hou G, Ma J, et al. Denoising MR images using non-local means filter with combined patch and pixel similarity. PLoS One. 2014; 9(6):e100240. doi: 10.1371/journal.pone.0100240.

[15A] Manjon J V, Coupe P, Marti-Bonmati L, Collins D L, Robles M. Adaptive non-local means denoising of MR images with spatially varying noise levels. J Magn Reson Imaging. 2010; 31(1):192-203. doi: 10.1002/jmri.22003.

[16A] Dabov K, Foi A, Katkovnik V, Egiazarian K. Image denoising with block-matching and 3D filtering. In Proc. SPIE 6064, Image Processing: Algorithms and Systems, Neural Networks, and Machine Learning, 606414. doi: 10.1117/12.643267.

[17A] Zhao T, Hoffman J, McNitt-Gray M, Ruan D. Ultra-low-dose CT image denoising using modified BM3D scheme tailored to data statistics. Med Phys. 2019; 46(1): 190-198. doi: 10.1002/mp.13252.

[18A] Lyu Q, Yang C, Gao H, et al. Technical Note: Iterative megavoltage CT (MVCT) reconstruction using block-matching 3D-transform (BM3D) regularization. Med Phys. 2018; 45(6):2603-2610. doi: 10.1002/mp.12916.

[19A] Harrison A P, Xu Z, Pourmorteza A, Bluemke D A, Mollura D J. A multichannel block-matching denoising algorithm for spectral photon-counting CT images. Med Phys. 2017; 44(6):2447-2452. doi: 10.1002/mp.12225.

[20A] Jiang D, Dou W, Vosters L, Xu X, Sun Y, Tan T. Denoising of 3D magnetic resonance images with multi-channel residual learning of convolutional neural network. Jpn J Radiol. 2018; 36(9):566-574. doi: 10.1007/s11604-018-0758-8.

[21A] Zhang K, Zuo W, Chen Y, Meng D, Zhang L. Beyond a Gaussian Denoiser: Residual Learning of Deep CNN for Image Denoising. IEEE Trans Image Process. 2017; 26(7):3142-3155. doi: 10.1109/TIP.2017.2662206.

[22A] Benou A, Veksler R, Friedman A, Riklin Raviv T. Ensemble of expert deep neural networks for spatiotemporal denoising of contrast-enhanced MRI sequences. Med Image Anal. 2017; 42:145-159. doi:10.1016/j.media.2017.07.006.

[23A] Vincent P, Larochelle H, Lajoie I, Bengio Y, Manzagol P A. Stacked Denoising Autoencoders: Learning Useful Representations in a Deep Network with a Local Denoising Criterion. J Mach Learn Res. 2010; 11:3371-3408.

[24A] Ulyanov D, Vedaldi A, Lempitsky V. Deep image prior. arXiv Preprints. 2017. arXiv:1711.10925.

[25A] Goodfellow I J, Pouget-Abadie J, Mirza M, et al. Generative Adversarial Networks. arXiv Preprints. 2014. arXiv:1406.2661.

[26A] Macovski A. Noise in MRI. Magn Reson Med. 1996; 36(3):494-497.

[27A] Gudbjartsson H, Patz S. The Racian distribution of noisy MRI data. Magn Reson Med. 1995; 34(6):910-914.

[28A] Thunberg P, Zetterberg P. Noise distribution in SENSE- and GRAPPA-reconstructed images: a computer simulation study. Magn Reson Imaging. 2007; 25(7): 1089-1094.

[29A] Aja-Fernandez S, Vegas-Sanchez-Ferrero G, Tristan-Vega A. Noise estimation in parallel MRI: GRAPPA and SENSE. Magn Reson Imaging. 2014; 32(3):281-290. doi: 10.1016/j.mri.2013.12.001.

[30A] Patrella J R, Provenzale J M. MR Perfusion imaging of the brain: techniques and applications. AJR Am J Roentgenol. 2000; 175(1):207-219.

[31A] Wang Z, Bovid A C, Sheikh H R, Simoncelli E P. Image quality assessment: from error visibility to structural similarity. IEEE Trans Image Process. 2004; 13(4): 600-612. doi: 10.1109/TIP.2003.819861.

[32A] Shin H C, Roth H R, Gao M, et al. Deep Convolutional Neural Networks for Computer-Aided Detection: CNN Architectures, Dataset Characteristics and Transfer Learning. IEEE Trans Med Imaging. 2016; 35(5):1285-1298. doi: 10.1109/TMI.2016.2528162. PMCID: PMC4890616.

[33A] Zhang X, Zhou X, Lin M, Sun J. ShuffleNet: An Extremely Efficient Convolutional Neural Network for Mobile Devices. arXiv Preprints. 2017. arXiv: 1707.01083.

[34A] http://www.bic.mni.mcgill.ca/brainweb/[35A] Cocosco C A, Kollokian V, Kwan R K, Evans A C. BrainWeb: Online Interface to a 3D MRI Simulated Brain Database. NeuroImage, 1997; 5(4):5425.

[36A] Kwan R K, Evans A C, Pike G B. MRI simulation-based evaluation of image-processing and classification methods. IEEE Trans Med Imaging. 1999; 18(11):1085-1097.

[37A] Kwan R K, Evans A C, Pike G B. An Extensible MRI Simulator for Post-Processing Evaluation. Visualization in Biomedical Computing (VBC'96). Lecture Notes in Computer Science, vol. 1131. Springer-Verlag, 1996. 135-140.

[38A] Collins D L, Zijdenbos A P, Kollokian V, et al. Design and Construction of a Realistic Digital Brain Phantom. IEEE Trans Med Imaging. 1998; 17(3):463-468.

[39A] Maggioni M, Katkovnik V, Egiazarian K, Foi A. Nonlocal transform-domain filter for volumetric data denoising and reconstruction. IEEE Trans Image Process. 2013; 22(1):119-133. doi: 10.1109/TIP.2012.2210725.

[40A] Saloner D. The AAPM/RSNA physics tutorial for residents. An introduction to MR angiography. Radiographics. 1995; 15(2):453-465.

[41A] Hartung M P, Grist T M, Francois C J. Magnetic resonance angiography: current status and future directions. J Cardiovasc Magn Reson. 2011; 13:19. doi: 10.1186/1532-429X-13-19. PMCID: PMC3060856.

[42A] Ghavhan G B, Babyn P S, Thomas B, Shroff M M, Haacke E M. Principles, techniques, and applications of T2*-based MR imaging and its special applications. Radiographics. 2009; 29(5):1433-1449. doi: 10.1148/rg.295095034. PMCID: PMC2799958.

[43A] Schaefer P W, Grant P W, Gonzalez R G. Diffusion-weighted MR imaging of the brain. Radiology. 2000; 217(2):331-345.

[44A] Patrella J R, Provenzale J M. MR Perfusion Imaging of the Brain Techniques and Applications. AJR Am J Roentgenol. 2000; 175(1):207-219.

[45A] Zhao L, Fielden S W, Feng X, Wintermark M, Muger J P 3rd, Meyer C H. Rapid 3D dynamic arterial spin labeling with a sparse model-based image reconstruction. Neuroimage. 2015; 205-216. doi: 10.1016/j.neuroimage.2015.07.018. PMCID: PMC4615585.

[46A] Feng X, Salerno M, Kramer C M, Meyer C H. Kalman filter techniques for accelerated Cartesian dynamic cardiac imaging. Magn Reson Med. 2013; 69(5): 1346-1356. doi: 10.1002/mrm.24375. PMCID: PMC3536913.

[47A] Feng X, Tustison N, Meyer C H. Brain Tumor Segmentation using an Ensemble of 3D U-Nets and Overall Survival Prediction using Radiomic Features. arXiv Preprints. 2018. arXiv:1812.01049.

[48A] Zhang K, Zuo W, Chen Y, Meng D, Zhang L. Beyond a Gaussian Denoiser: Residual Learning of Deep CNN for Image Denoising. 13 Aug. 2016. arXiv:1608.03981 [cs.CV].

[49A] El-Rewaidy H, Neisius U, Mancio J, et al. Deep complex convolutional network for fast reconstruction of 3D late gadolinium enhancement cardiac MRI. NMR Biomed. 2020; 33(7):e4312.

[50A] Trabelsi C, Bilaniuk O, Zhang Y, et al. Deep Complex Networks. 25 Feb. 2018. arXiv:1705.09792 [cs.NE].

[51A] Coupé P, Yger P, Barillot C. Fast non local means denoising for 3D MR images. *Med Image Comput Comput Assist Interv.* 2006; 9 (Pt 2):33-40.

[52A] Lebrun M. An analysis and implementation of the BM3D image denoising method. Image Processing On Line. 2012; pp. 175-213.

[53A] Knoll F, Zbontar J, Sriram A, et al. fastMRI: A Publicly Available Raw k-Space and DICOM Dataset of Knee Images for Accelerated MR Image Reconstruction Using Machine Learning. Radiol Artif Intell. 2020; 2(1): e190007.

[54A] Zbontar J, Knoll F, Sriram A, et al. fastMRI: An Open Dataset and Benchmarks for Accelerated MRI. 2018. arXiv:1811.08839 [cs.CV].

[55A] Zbontar J, Tygert M. Simulating single-coil MRI from the responses of multiple coils. 2018. arXiv:1811.08026 [eess.IV].

[56A] Darbon J, Cunha A, Chan T F, Osher S, Jensen G J. Fast nonlocal filtering applied to electron cryomicroscopy. 5th IEEE International Symposium on Biomedical Imaging. 2008; pp. 1331-1334.

[57A] Makinen Y, Azzari L, Foi A. Collaborative Filtering of Correlated Noise: Exact Transform-Domain Variance for Improved Shrinkage and Patch Matching. IEEE Trans Image Process. 2020; PP:10.1109/TIP.2020.3014721.

SECOND LIST OF SUPPLEMENTAL REFERENCES

[1B] Diaz I, Boulanger P, Greiner R, Murtha A. A critical review of the effects of de-noising algorithms on MRI brain tumor segmentation. Annu Int Conf IEEE Eng Med Biol Soc. 2011; 2011:3934-3937.

[2B] Despotovid I, Goossens B, Philips W. MRI segmentation of the human brain: challenges, methods, and applications. Comput Math Methods Med. 2015; 2015:450341.

[3B] Rohde G K, Barnett A S, Basser P J, Pierpaoli C. Estimating intensity variance due to noise in registered images: applications to diffusion tensor MRI. Neuroimage. 2005; 26(3):673-684.

[4B] Dadar M, Fonov V S, Collins D L, Alzheimer's Disease Neuroimaging Initiative. A comparison of publicly available linear MRI stereotaxic registration techniques. Neuroimage. 2018; 174:191-200.

[5B] Marques J P, Simonis F F J, Webb A G. Low-field MRI: An MR physics perspective. J Magn Reson Imaging. 2019; 49(6):1528-1542.

[6B] Campbell-Washburn A E, Ramasawmy R, Restivo M C, et al. Opportunities in Interventional and Diagnostic Imaging by Using High-Performance Low-Field-Strength MRI. Radiology. 2019; 293(2):384-393.

[7B] Wald L L, McDaniel P C, Witzel T, Stockmann J P, Cooley C Z. Low-cost and portable MRI. J Magn Reson Imaging. 2020; 52(3):686-696.

[8B] Sheth K N, Mazurek M H, Yuen M M, et al. Assessment of Brain Injury Using Portable, Low-Field Magnetic Resonance Imaging at the Bedside of Critically Ill Patients. JAMA Neurol. 2020; 78(1):41-47.

[9B] Edelstein W A, Bottomley P A, Pfeifer L M. A signal-to-noise calibration procedure for NMR imaging systems. Med Phys. 1984; 11(2):180-185.

[10B] Gudbjartsson H, Patz S. The Rician distribution of noisy MRI data. Magn Reson Med. 1995; 34(6):910-914.

[11B] Buades A, Coll B, Morel J M. A non-local algorithm for image denoising. In: 2005 IEEE Computer Society Conference on Computer Vision and Pattern Recognition (CVPR'05). Vol 2.; 2005:60-65 vol. 2.

[12B] Darbon J, Cunha A, Chan T F, Osher S, Jensen G J. Fast nonlocal filtering applied to electron cryomicroscopy. In: 2008 IEEE International Symposium on Biomedical Imaging: From Nano to Macro. IEEE; 2008: 1331-1334.

[13B] Buades A, Coll B, Morel J M. Non-Local Means Denoising. Image Processing On Line. 2011; 1:208-212.

[14B] Wiest-Daesslé N, Prima S, Coupé P, Morrissey S P, Barillot C. Rician noise removal by non-Local Means filtering for low signal-to-noise ratio MRI: applications to D T-MRI. Med Image Comput Comput Assist Interv. 2008; 11(Pt 2):171-179.

[15B] Coupé P, Yger P, Prima S, Hellier P, Kervrann C, Barillot C. An optimized blockwise nonlocal means denoising filter for 3-D magnetic resonance images. IEEE Trans Med Imaging. 2008; 27(4):425-441.

[16B] Dabov K, Foi A, Katkovnik V, Egiazarian K. Image denoising with block-matching and 3D filtering. In: Image Processing: Algorithms and Systems, Neural Networks, and Machine Learning. Vol 6064. SPIE; 2006:354-365.

[17B] Dabov K, Foi A, Katkovnik V, Egiazarian K. Image Denoising by Sparse 3-D Transform-Domain Collaborative Filtering. IEEE Trans Image Process. 2007; 16(8): 2080-2095.

[18B] Eksioglu E M. Decoupled Algorithm for MRI Reconstruction Using Nonlocal Block Matching Model: BM3D-MRI. J Math Imaging Vis. 2016; 56(3):430-440.

[19B] Zhang K, Zuo W, Chen Y, Meng D, Zhang L. Beyond a Gaussian Denoiser: Residual Learning of Deep CNN for Image Denoising. IEEE Trans Image Process. 2017; 26(7):3142-3155.

[20B] Zhang K, Zuo W, Zhang L. FFDNet: Toward a Fast and Flexible Solution for CNN based Image Denoising. IEEE Trans Image Process. 2018; 27(9):4608-4622.

[21B] Manjón J V, Coupé P. MRI denoising using deep learning. In: International Workshop on Patch-Based Techniques in Medical Imaging. Springer; 2018:12-19.

[22B] Li S, Zhou J, Liang D, Liu Q. MRI denoising using progressively distribution-based neural network. Magn Reson Imaging. 2020; 71:55-68.

[23B] Tian M, Song K. Boosting Magnetic Resonance Image Denoising With Generative Adversarial Networks. IEEE Access. 2021; 9:62266-62275.

[24B] Koonjoo N, Zhu B, Bagnall G C, Bhutto D, Rosen M S. Boosting the signal-to-noise of low-field MRI with deep learning image reconstruction. Sci Rep. 2021; 11(1): 8248.

[25B] Nitta T. On the critical points of the complex-valued neural network. In: Proceedings of the 9th International Conference on Neural Information Processing, 2002. ICONIP '02. Vol 3.; 2002:1099-1103 vol. 3.

[26B] Arjovsky M, Shah A, Bengio Y. Unitary evolution recurrent neural networks. In: International Conference on Machine Learning. PMLR; 2016:1120-1128.

[27B] Danihelka I, Wayne G, Uria B, Kalchbrenner N, Graves A. Associative long short-term memory. In: International Conference on Machine Learning. PMLR; 2016: 1986-1994.

[28B] Trabelsi C, Bilaniuk O, Zhang Y, et al. Deep Complex Networks. 2017. arXiv:1705.09792 [cs.NE].

[29B] Wang S, Cheng H, Ying L, et al. Deepcomplex MRI: Exploiting deep residual network for fast parallel MR imaging with complex convolution. Magn Reson Imaging. 2020; 68:136-147.

[30B] El-Rewaidy H, Neisius U, Mancio J, et al. Deep complex convolutional network for fast reconstruction of 3D late gadolinium enhancement cardiac MRI. NMR Biomed. 2020; 33(7):e4312.

[31B] Cole E, Cheng J, Pauly J, Vasanawala S. Analysis of deep complex-valued convolutional neural networks for MRI reconstruction and phase-focused applications. Magn Reson Med. 2021; 86(2):1093-1109.

[32B] Zbontar J, Knoll F, Sriram A, et al. fastMRI: An Open Dataset and Benchmarks for Accelerated MRI. 2018. arXiv:1811.08839 [cs.CV].

[33B] Knoll F, Zbontar J, Sriram A, et al. fastMRI: A Publicly Available Raw k-Space and DICOM Dataset of Knee Images for Accelerated MR Image Reconstruction Using Machine Learning. Radiology: Artificial Intelligence. 2020; 2(1):e190007.

[34B] Walsh D O, Gmitro A F, Marcellin M W. Adaptive reconstruction of phased array MR imagery. Magn Reson Med. 2000; 43(5):682-690.

[35B] Ioffe S, Szegedy C. Batch normalization: Accelerating deep network training by reducing internal covariate shift. In: International Conference on Machine Learning. PMLR; 2015:448-456.

[36B] Paszke A, Gross S, Massa F, et al. Pytorch: An imperative style, high-performance deep learning library. Advances in neural information processing systems. 2019; 32.

[37B] Kingma D P, Ba J. Adam: A Method for Stochastic Optimization. 2014. arXiv:1412.6980 [cs.LG].

[38B] Donoho D L, Johnstone I M. Ideal spatial adaptation by wavelet shrinkage. Biometrika. 1994; 81(3):425-455.
[39B] Walt S van der, Schonberger J L, Nunez-Iglesias J, et al. scikit-image: image processing in Python. PeerJ. 2014; 2:e453.
[40B] Pruessmann K P, Weiger M, Scheidegger M B, Boesiger P. SENSE: sensitivity encoding for fast MRI. Magn Reson Med. 1999; 42(5):952-962.
[41B] Griswold M A, Jakob P M, Heidemann R M, et al. Generalized autocalibrating partially parallel acquisitions (GRAPPA). Magn Reson Med. 2002; 47(6):1202-1210.
[42B] Wang Z, Bovik A C, Sheikh H R, Simoncelli E P. Image quality assessment: from error visibility to structural similarity. IEEE Trans Image Process. 2004; 13(4): 600-612.
[43B] Aja-Fernindez S, Vegas-Sinchez-Ferrero G, Tristin-Vega A. Noise estimation in parallel MRI: GRAPPA and SENSE. Magn Reson Imaging. 2014; 32(3):281-290.
[44B] National Electrical Manufacturers Association. NEMA Standards Publication MS1-2008. Determination of Signal-to-Noise Ratio (SNR) in Diagnostic Magnetic Resonance Imaging. 2008.
[45B] Otsu N. A Threshold Selection Method from Gray-Level Histograms. IEEE Transactions on Systems, Man, and Cybernetics. 1979; 9(1):62-66.
[46B] Ronneberger O, Fischer P, Brox T. U-net: Convolutional networks for biomedical image segmentation. In: International Conference on Medical Image Computing and Computer-Assisted Intervention. Springer; 2015:234-241.
[47B] Feng X, Tustison N J, Patel S H, Meyer C H. Brain Tumor Segmentation Using an Ensemble of 3D U-Nets and Overall Survival Prediction Using Radiomic Features. Front Comput Neurosci. 2020; 14:25.
[48B] Hyun C M, Kim H P, Lee S M, Lee S, Seo J K. Deep learning for undersampled MRI reconstruction. Phys Med Biol. 2018; 63(13):135007.
[49B] Souza R, Bento M, Nogovitsyn N, et al. Dual-domain cascade of U-nets for multi-channel magnetic resonance image reconstruction. Magn Reson Imaging. 2020; 71:140-153.
[50B] Zhao H, Gallo O, Frosio I, Kautz J. Loss Functions for Image Restoration With Neural Networks. IEEE Trans Comput Imaging. 2017; 3(1):47-57.
[51B] Ledig C, Theis L, Huszir F, et al. Photo-realistic single image super-resolution using a generative adversarial network. In: Proceedings of the IEEE Conference on Computer Vision and Pattern Recognition.; 2017:4681-4690.
[52B] Yang Q, Yan P, Zhang Y, et al. Low-Dose CT Image Denoising Using a Generative Adversarial Network With Wasserstein Distance and Perceptual Loss. IEEE Trans Med Imaging. 2018; 37(6):1348-1357.
[53B] Delakis I, Hammad O, Kitney R I. Wavelet-based de-noising algorithm for images acquired with parallel magnetic resonance imaging (MRI). Phys Med Biol. 2007; 52(13):3741-3751.
[54B] Guo W, Huang F. Adaptive total variation based filtering for MRI images with spatially inhomogeneous noise and artifacts. In: 2009 IEEE International Symposium on Biomedical Imaging: From Nano to Macro. IEEE; 2009:101-104.
[55B] Coupé P, Manjón J V, Gedamu E, Arnold D, Robles M, Collins D L. Robust Rician noise estimation for MR images. Med Image Anal. 2010; 14(4):483-493.
[56B] Goodfellow I, Pouget-Abadie J, Mirza M, et al. Generative adversarial networks. Commun ACM. 2020; 63(11):139-144.
[57B] Mardani M, Gong E, Cheng J Y, et al. Deep Generative Adversarial Neural Networks for Compressive Sensing MRI. IEEE Trans Med Imaging. 2019; 38(1):167-179.

The invention claimed is:

1. A computer-implemented method of denoising a magnetic resonance (MR) image, comprising:

acquiring complex magnetic resonance (MR) image data of an area of interest of a subject, wherein the image data comprises complex noisy input images of multi-coil MR image data, and wherein the complex noisy input images comprise noise data and noise free image data;

for each of the noisy input images:

calculating complex single coil data from the complex noisy input images of multi-coil MR image data;

running an iteration of a complex convolution to a converging sequence with a complex de-noising convolutional neural network (C-DnCNN), wherein running an iteration of the complex convolution comprises running the complex convolution on a real part of the complex single coil data and an imaginary part of the complex single coil data in a single calculation;

in each iteration, updating parameter settings used in calculating a series of image feature sets with the C-DnCNN, the image feature sets predicting a respective residual image from the complex noisy input images that further comprise a corresponding latent clean image; and removing a final latent clean image from the complex noisy input images.

2. The computer implemented method of claim 1, wherein the complex convolutions are applied directly to the complex single coil data representing the complex noisy images.

3. The computer implemented method of claim 2, wherein the complex convolutions are of the form W*d=(A*x−B*y)+i(B*x+A*y) where W=A+iB is a complex filter and d=x+iy represents the complex single coil data.

4. The computer implemented method of claim 3, further comprising applying radial batch normalization to each iteration of the complex convolution.

5. The computer implemented method of claim 4, wherein within the radial batch normalization, updating the parameters comprising a mean and a variance of the complex single coil data.

6. The computer implemented method of claim 4, further comprising applying the radial batch normalization according to a complex data expression:

$$r_{BN} = \left(\frac{(r-\mu_r)}{\sqrt{\sigma_r^2}}\right)\gamma + \beta + \tau,\ d_{BN} = r_{BN}e^{i\theta}$$

where $$\mu_r \text{ and } \sigma_r^2$$

of r, β and γ are trainable parameters, and τ is constant to ensure the normalized $r_{BN}$ to be positive, and d=x+iy representing the complex single coil data.

7. The computer implemented method of claim 6, further comprising applying a complex rectified linear unit C-ReLu at each iteration of the complex convolution.

8. The computer implemented method of claim 7, further comprising separately activating a real part and an imaginary part of the C-ReLu at each iteration with an expression of the ReLu comprising:

$$C-RelU(d)=ReLU(x)+iReLU(y)$$

wherein d=x+iy represents the complex single coil data.

9. The computer implemented method of claim 1, further comprising training the complex de-noising convolutional neural network (C-DnCNN) with image pairs corresponding to each iteration by:

forming an image pairing of an original frame of noise free magnetic resonance MR) image data and a respectively updated frame of noise corrupted magnetic resonance MR) image data; and applying the image pairing to the complex de-noising convolutional neural network (C-DnCNN) to train the neural network iteratively.

10. The computer implemented method of claim 9, wherein the noise corrupted magnetic resonance (MR) image data comprises random complex Gaussian noise.

11. The computer implemented method of claim 10, wherein training the complex de-noising convolutional neural network (C-DnCNN) comprises utilizing random patch cropping as a training augmentation.

12. The computer implemented method of claim 1, wherein running an iteration of the complex convolution comprises running the complex convolution on the real part of the complex single coil data and the imaginary part of the complex single coil data simultaneously.

13. A system for denoising a magnetic resonance (MR) image, comprising:

one or more processors;

a memory device coupled to the one or more processors and storing instructions which, when executed by the one or more processors, cause the system to perform functions that include:

acquiring complex magnetic resonance (MR) image data of an area of interest of a subject, wherein the image data comprises complex noisy input images of multi-coil MR image data, and wherein the complex noisy input images comprise noise data and noise free image data;

for each of the noisy input images:

calculating complex single coil data from the complex noisy input images of multi-coil MR image data;

running an iteration of a complex convolution to a converging sequence with a complex de-noising convolutional neural network (C-DnCNN), wherein running an iteration of the complex convolution comprises running the complex convolution on a real part of the complex single coil data and an imaginary part of the complex single coil data in a single calculation;

in each iteration, updating parameter settings used in calculating a series of image feature sets with the C-DnCNN, the image feature sets predicting a respective residual image from the complex noisy input images, relative to a corresponding latent clean image; and removing a final latent clean image from the noisy input images.

14. A non-transitory computer-readable medium storing instructions thereon which, when executed by one or more processors, cause a computer to perform functions for denoising a magnetic resonance (MR) image that include:

acquiring complex magnetic resonance (MR) image data of an area of interest of a subject, wherein the image data comprises complex noisy input images of multi-coil MR image data, and wherein the complex noisy input images comprise noise data and noise free image data;

for each of the noisy input images:

calculating complex single coil data from the complex noisy input images of multi-coil MR image data;

running an iteration of a complex convolution to a converging sequence with a complex de-noising convolutional neural network (C-DnCNN), wherein running an iteration of the complex convolution comprises running the complex convolution on a real part of the complex single coil data and an imaginary part of the complex single coil data in a single calculation;

in each iteration, updating parameter settings used in calculating a series of image feature sets with the C-DnCNN, the image feature sets predicting a respective residual image from the complex noisy input images, relative to a corresponding latent clean image; and removing a final latent clean image from the noisy input images.

15. The system of claim 13, wherein the complex convolutions are applied directly to the complex single coil data representing the complex noisy images.

16. The system of claim 13, wherein running an iteration of the complex convolution comprises running the complex convolution on the real part of the complex single coil data and the imaginary part of the complex single coil data simultaneously.

* * * * *